(12) United States Patent
Yoshikawa et al.

(10) Patent No.: US 9,500,856 B2
(45) Date of Patent: Nov. 22, 2016

(54) OPTICAL DEVICE

(71) Applicant: Nidec Sankyo Corporation, Suwa-gun, Nagano (JP)

(72) Inventors: Shinichi Yoshikawa, Nagano (JP); Masaaki Ando, Nagano (JP); Tsuneo Sato, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 14/529,660

(22) Filed: Oct. 31, 2014

(65) Prior Publication Data

US 2015/0124193 A1 May 7, 2015

(30) Foreign Application Priority Data

Oct. 31, 2013 (JP) ................. 2013-227411

(51) Int. Cl.
*G02B 26/08* (2006.01)
*G02F 1/1335* (2006.01)
*G02F 1/1333* (2006.01)
*G03B 21/56* (2006.01)

(52) U.S. Cl.
CPC ..... *G02B 26/0825* (2013.01); *G02F 1/133305* (2013.01); *G02F 1/133608* (2013.01); *G03B 21/56* (2013.01)

(58) Field of Classification Search
CPC .............. G02F 1/133305; G02F 1/133308; G02F 1/133608; G02B 26/0825; G03B 21/56; G03B 21/58
USPC .................................. 359/451, 443
See application file for complete search history.

(56) References Cited

U.S. PATENT DOCUMENTS

| | | | | |
|---|---|---|---|---|
| 5,016,998 A | * | 5/1991 | Butler | F24J 2/125 |
| | | | | 359/846 |
| 2005/0128173 A1 | * | 6/2005 | Booh et al. | 345/87 |
| 2011/0095975 A1 | * | 4/2011 | Hwang et al. | 345/156 |
| 2012/0105333 A1 | * | 5/2012 | Maschmeyer et al. | 345/173 |
| 2012/0314315 A1 | * | 12/2012 | Yoshimura | F24J 2/10 |
| | | | | 359/853 |
| 2013/0329422 A1 | * | 12/2013 | Park et al. | 362/233 |

FOREIGN PATENT DOCUMENTS

| | | |
|---|---|---|
| JP | 6-3650 A | 1/1994 |
| JP | 10-268790 A | 10/1998 |

* cited by examiner

*Primary Examiner* — Christopher Mahoney
(74) *Attorney, Agent, or Firm* — Cantor Colburn LLP

(57) ABSTRACT

An optical device may include a flat optical member; a reinforcement member which is bonded to a back side of the optical member and demonstrates stronger rigidity in a center area thereof than two side portions thereof when curved in a thickness direction in a first direction within an in-plane direction; and a driving device which switches a shape of the optical member together with the reinforcement member between a flat state and a curved state in which the optical member is curved in the first direction.

11 Claims, 19 Drawing Sheets

OPTICAL DEVICE

CROSS REFERENCE TO RELATED APPLICATION

The present invention claims priority under 35 U.S.C. §119 to Japanese Application No. 2013-227411 filed Oct. 31, 2013, the entire contents of which are incorporated herein by reference.

FIELD OF THE INVENTION

The present invention relates to an optical device that can be used having a panel-like optical member in the curved state.

BACKGROUND

A flat optical member such as a mirror, an organic electroluminescence display panel, an LCD panel, etc. may take the form of curve, taking advantage of a substrate composed of a metallic plate or a glass substrate. It has been proposed that an LC panel, for example, be curved according to the purpose of usage (Patent References 1 and 2).

PATENT REFERENCE

[Patent reference 1] Unexamined Japanese Patent Application H6-3650 Publication
[Patent reference 2] Unexamined Japanese Patent Application H10-268790 Publication In the technology disclosed in Patent references 1 and 2, however, a flat optical member is curved by merely applying stress to the center portion or the side portions thereof; therefore, even when the flat optical member is curved in an arc shape, for example, the curvature of the center portion becomes too small, presenting a problem that the optical member cannot be precisely curved to a desired shape. Also, in the technologies disclosed in Patent references 1 and 2, a flat optical member is fixed in the curved state; therefore, the optical member cannot be reshaped according to the usage.

Note that, as shown in FIGS. 19 (a) and (b), a back plate 9 composed of a steel plate having a uniform thickness can be bonded to the entire back surface of the optical member 2; however, even when such a back plate 9 is bonded, it is difficult to solve the problem that the curvature of the center portion becomes too small when it's curved as shown in FIG. 19 (c).

SUMMARY

Then, at least an embodiment of the present invention provides an optical device in which a flat optical member can precisely be curved into a desired form and also reshaped.

To achieve the above, an optical device of at least an embodiment of the present invention comprises a flat optical member, a reinforcement member which is bonded to the back side of the optical member and demonstrates stronger rigidity in the center thereof than in two side portions thereof when curved in the first direction in the in-plane direction of the optical member, and a driving device which changes the form of the optical member together with the reinforcement member between the flat shape and the curved shape in which the optical member is curved in the first direction.

In at least an embodiment of the present invention, the reinforcement member which demonstrates stronger rigidity in the center area than in the two side portions in the first direction is bonded on the back side of the flat optical member; therefore, when the optical member is curved by the driving device applying stress to the center portion or the side portions, the curvature of the center portion is kept from becoming too small. Thus, the flat optical member can precisely be curved into a desired shape. Also, the driving device switches the shape of the optical member together with the reinforcement member between the flat state and the curved state; therefore, the optical member can be used in either the flat state or in the curved state according to the usage. Further, the degree of curvature can be changed.

In at least an embodiment of the present invention, it is preferred that the reinforcement member be formed such that the dimension thereof in the second direction orthogonal to the first direction in the in-plane direction is widened from the two side portions toward the center. According to this configuration, the reinforcement member can be manufactured from a plate material (a plate) having a uniform thickness; therefore, the reinforcement member can be configured inexpensively. Also, it is easy to manufacture a reinforcement member having a different rigidity distribution from a plate material (a plate) having a uniform thickness.

In at least an embodiment of the present invention, it is preferred that the reinforcement member be formed such that the dimension thereof in the second direction orthogonal to the first direction in the in-plane direction is steadily widened from the two side portions toward the center. According to such a configuration, when the optical member is curved, the entire curvature in the first direction can be adjusted.

In at least an embodiment of the present invention, it is preferred that the reinforcement member have a center portion which is layered on the center area of the optical member in the first direction, a first extension portion which extends from one end of the center portion in the second direction toward the two side portions, and a second extension portion which extends from the other end of the center portion in the second direction toward the two side portions, and that the first extension portion and the second extension portion be formed such that the dimensions thereof is widened from the two side portions toward the center.

In at least an embodiment of the present invention, it is preferred that the reinforcement member be formed such that the center area thereof is thicker than the two side portions in the first direction. According to this configuration, the reinforcement member can be bonded to the entire surface of the optical member; therefore, the reinforcement member can function as a back surface cover for the optical member.

In at least an embodiment of the present invention, it is preferred that the driving device have a motor as a driving source. According to this configuration, the driving device can be actuated when simply connected to a power source. Therefore, the installation of the optical device is easy.

In at least an embodiment of the present invention, the driving device can adopt the configuration that comprises a center holding portion for holding the center of the optical member, a first side holding portion for holding the first side portion, one of the two side portions of the optical member, a second side holding portion for holding the second side portion, the other of the two side portions of the optical member and a transmission mechanism which transmits the driving force of the motor to move the first side holding portion and the second side holding portion in the thickness direction of the optical member relative to the center holding portion.

In this case, the transmission mechanism can adopt the configuration that transmits the driving force of the motor to displace the first side holding portion and the second side holding portion in the thickness direction of the optical member with respect to the center holding portion.

Further, the transmission mechanism may adopt the configuration that transmits the driving force of the motor to displace the position of the center holding portion in the thickness direction of the optical member relative to the first side holding portion and the second side holding portion.

In at least an embodiment of the present invention, the driving device may adopt the configuration that comprises a first side holding portion for holding the first side, one of the two side portions of the optical member, a second side holding portion for holding the second side portion, the other of the two side portions of the optical member, and a transmission mechanism that transmits the driving force of the motor to displace either the first side holding portion or the second side holding portion in the direction closer to the other or in the direction farther from the other.

In at least an embodiment of the present invention, it is preferred that the driving device include a speed reduction mechanism for reducing the driving force of the motor and transmitting it. According to this configuration, the optical member can be curved by using a small-size motor.

In at least an embodiment of the present invention, the reinforcement member which has stronger rigidity in the center area than in the two side portions in the first direction is bonded on the back side of the flat optical member; therefore, the curvature of the center portion is kept from becoming too small when the optical member is curved as the driving device applies stress to the center portion or the side portions. Therefore, the flat optical member can precisely be formed in a desired curved shape. Also, the driving device switches the shape of the optical member together with the reinforcement member between the flat state and the curved state; therefore, the optical member can be used either in the flat state or in the curved state according to the usage. Further, the degree of the curvature can be adjusted.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1A:
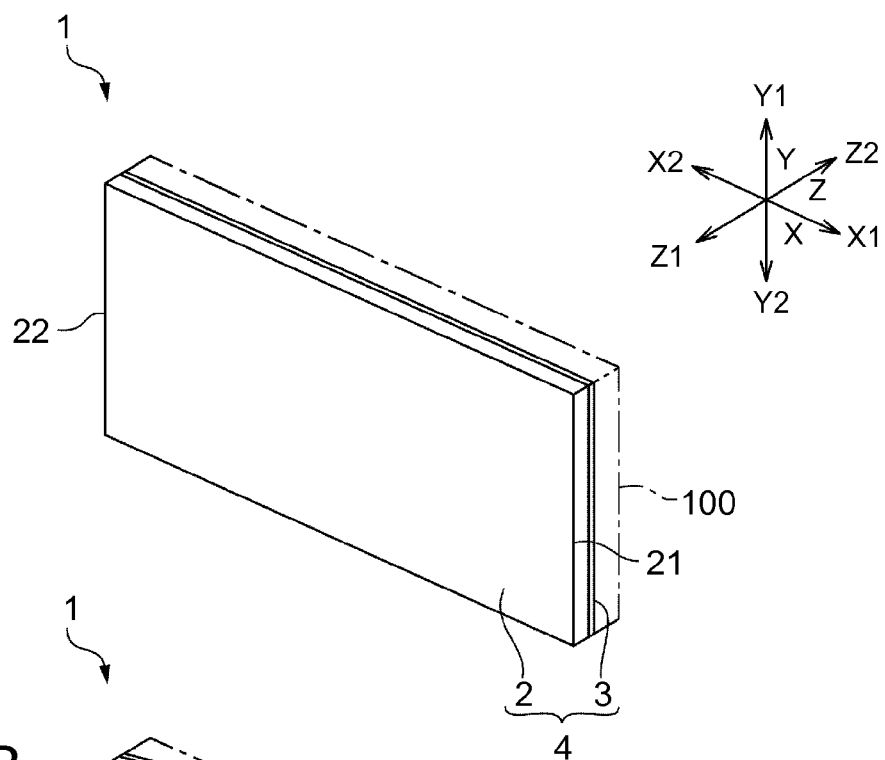
FIGS. 1A-1B are explanatory diagrams of an optical device to which at least an embodiment of the present invention is applied.

An optical device to which at least an embodiment of the present invention is applied is described hereinafter referring to the drawings. In at least an embodiment of the present invention, the in-plane direction of a flat optical member and a flat reinforcement member (a reinforcement plate) means the direction within the plane of the optical member and the reinforcement member, and the out-plane direction means the direction orthogonal to the in-plane direction of the optical member and the reinforcement plane (the thickness direction of the optical member and the thickness direction of the reinforcement member). Also, in the in-plane direction of the optical member and the reinforcement member, the direction in which the optical member is curved toward the out-plane direction is the first direction (X direction), and the direction orthogonal to the first direction (X direction) is the second direction (Y direction). Further, the out-plane direction of the optical member is the third direction (Z direction). Note that, in the description below, the right side facing the front of the optical device is one side X1 in the first direction (X direction) while the left side facing the front of the optical device is the other side X2 in the first direction (X direction). Also, the upper side facing the front of the optical device is one side Y1 in the second direction (Y direction) while the lower side facing the front of the optical device is the other side Y2 in the second direction (Y direction). Further, the front side of the optical device is one side Z in the third direction (Z direction) while the back side of the optical device is the other side Z2 in the third direction (Z direction).

Note that, in the description hereinafter, the flat optical member 2 is bonded with the reinforcement member 3 to configure a panel 4 with a reinforcement member. Therefore, 'the optical member 2' and ' the panel 4' are used interchangeably as synonyms, to describe that the optical member 2 is curved as that the panel 4 is curved, except for special cases.

(Optical Device)

Figure 1B:
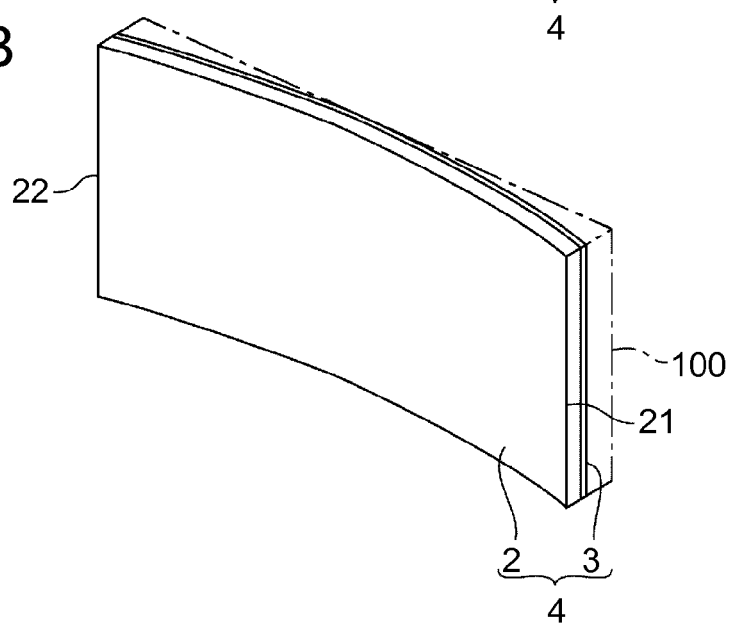

FIG. 1 is an explanatory diagram of an optical device to which at least an embodiment of the present invention is applied: FIGS. 1 (a) and (b) show respectively an explanatory diagram of a flat optical device, viewing the front of the device in the diagonal direction and an explanatory diagram of a curved optical device, viewing the front of the device in the diagonal direction.

In FIG. 1, the optical device 1 of this embodiment has a flat optical member 2 and a flat reinforcement member 3 (a reinforcement plate) bonded to the back side Z2 of the optical member 2, together which configure a flat panel 4. The optical member 2 is in a rectangle shape having a 1 to 5 mm thickness, a 800 to 1500 mm length in the first direction X (the lateral dimension) and a 300 to 1000 mm length in the second direction Y (the vertical dimension).

The optical device 1 also has a driving device 100 which applies stress to the center portion or to the two sides of the panel 4 in the first direction to switch the shape of the optical member 2 together with the reinforcement member 3 between the flat state (referring to FIG. 1 (a)) and the curved state (referring to FIG. 1 (b)) in which the optical member 2 is curved in the third direction Z (in the out-plane direction, the thickness direction of the optical member 2, the thickness direction of the reinforcement member 3) within the first direction X. In this embodiment, when the panel 4 is curved, the optical member 2 and the reinforcement member 3 are bent such that the center portion thereof in the first direction X is positioned toward the back side (the other side Z2 in the third direction Z) relative to the two side portions thereof in the first direction X. Note that the optical member 2 and the reinforcement member 3 may be curved such that the center portion thereof in the first direction X is positioned toward the front side (one side Z1 in the third direction Z) relative to the two side portions thereof in the first direction X.

In the optical device 1 of this embodiment, the optical member 2 is a mirror, an organic electroluminescence display panel or a liquid crystal display panel. When the optical member 2 is a mirror, the optical device 1 is used at an amusement park or a shop. When the optical member 2 is an organic electroluminescence display panel device or a liquid display panel, the optical device 1 is used as a display device in a home theatre or at an outdoor theatre. The driving device 100 can be controlled by a switch provided near the panel 4 in the optical device 1 as well as by a remote controller.

(First Configuration Example of Reinforcement Member 3)

Figure 2A:
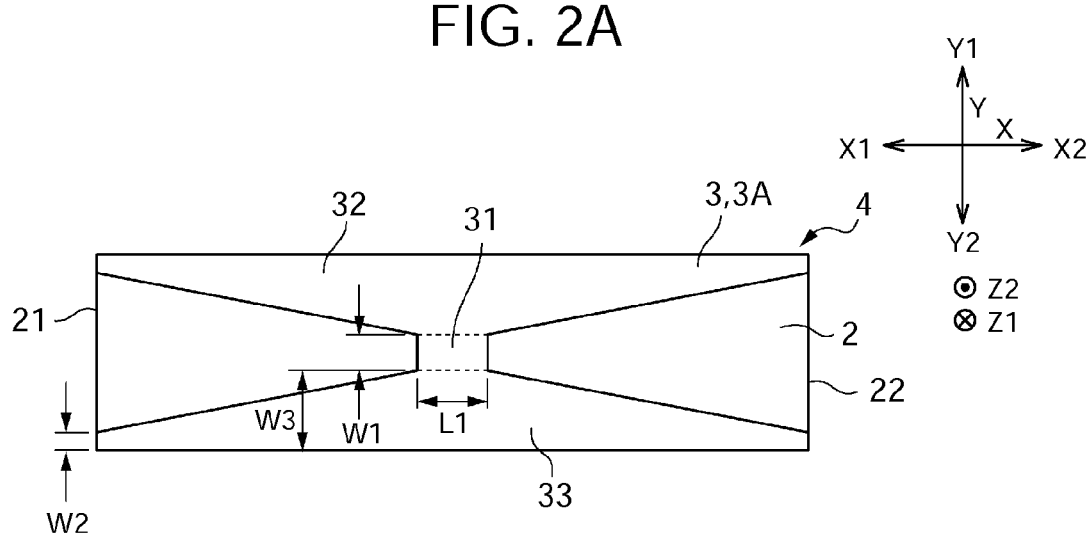
FIGS. 2A-2C are explanatory diagrams of the first configuration example of a reinforcement member used in the optical device to which at least an embodiment of the present invention is applied.
Figure 2B:
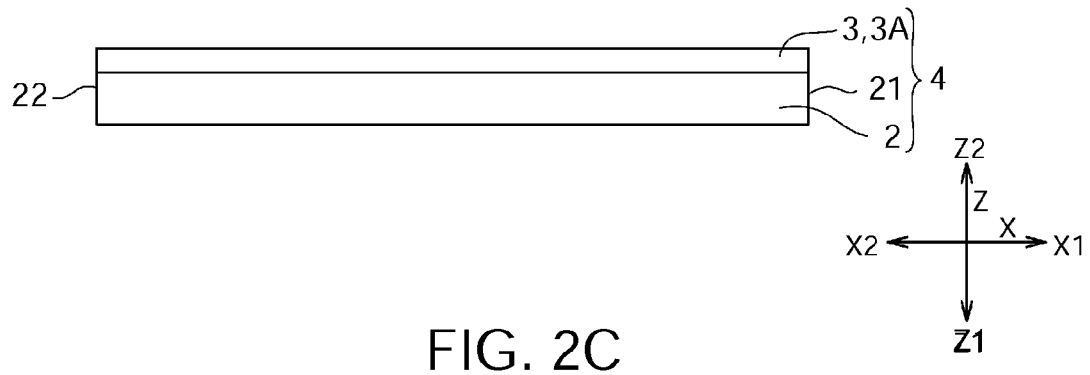
Figure 2C:
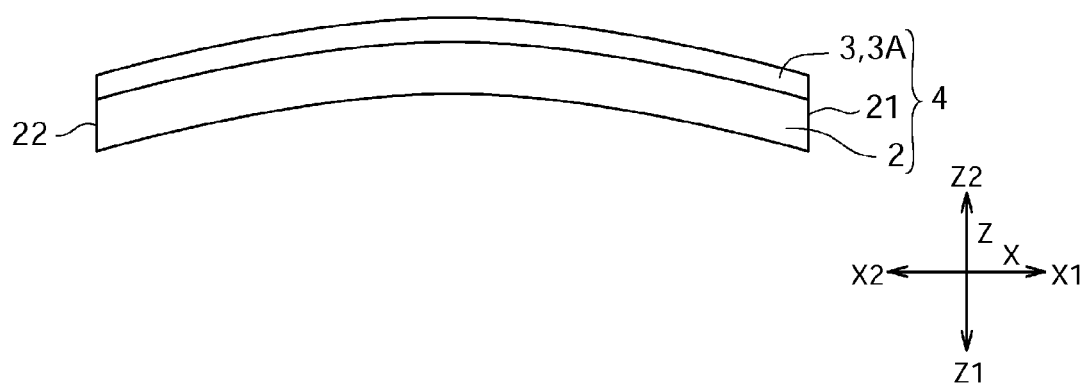

FIG. 2 is an explanatory diagram of the first configuration example of the reinforcement member 3 used in the optical device 1 to which at least an embodiment of the present invention is applied: FIGS. 2 (a), (b) and (c) are respectively an explanatory diagram of the flat panel 4 viewed from the back, an explanatory diagram of the flat panel 4 viewed from the top and an explanatory diagram of the curved panel 4 viewed from the top.

As shown in FIG. 2, the flat reinforcement member 3 (a reinforcement member A: the reinforcement plate) used in the optical device 1 of this embodiment is formed such that stronger rigidity is demonstrated in the center portion than in the two side portions when curved in the thickness direction from the first direction X within the in-plane direction of the optical member 2. In this embodiment, the reinforcement member 3A has a uniform thickness within the in-plane direction, and the dimension thereof in the second direction Y continually increases from the two side portions toward the center portion. Therefore, the rigidity of the panel 4 continually increases from the two side portions in the first direction X toward the center portion.

In this embodiment, the reinforcement member 3A is formed such that the dimension thereof in the second direction Y continually increases from the side portions in the first direction X toward the center portion. Therefore, the rigidity of the reinforcement member 3A continually increases from the two side portions in the first direction X toward the center portion.

More specifically described, the reinforcement member 3A has the center portion 31 which layers on the center area of the optical member 2 in the first direction X, the first extension portion 32 which extends in the first direction X from the edges of the center portion 31 on one side Y1 in the second direction Y toward the two side (or corner) portions in the first direction X, and the second extension portion 33 which extends in the first direction X from the edges of the center portion 31 on the other side Y2 in the second direction Y toward the two side (or corner) portions in the first direction X; the dimension of the first extension portion 32 and the second extension portion 33 in the second direction Y continually increases from the two side (or corner) portions toward the center.

The edge of the first extension portion 32 on one side Y1 in the second direction Y layers on the edge of the optical member 2 which is positioned on one side Y1 in the second direction Y and extends in the first direction X; the edge of the first extension portion 32 on the other side Y2 in the second direction Y is an oblique line to increase the dimension of the first extension portion 32 in the second direction Y from the two side (or corner) portions toward the center; the edges of the first extension portion 32 on two sides in the first direction X layer on the edges of the optical member 2 which extends in the second direction Y at two sides in the first direction X. Also, the edge of the second extension portion 33 on the other side Y2 in the second direction Y layers on the edge of the optical member 2 which is positioned on the other side Y2 in the second direction Y and extends in the first direction X; the edge of the second extension portion 33 on one side Y1 in the second direction Y is an oblique line to increase the dimension of the second extension portion 33 in the second direction Y from the two side (or corner) portions toward the center; and the edges of the second extension portion 33 on both ends in the second direction Y layers on the edges of the optical member 2 which are positioned on both ends in the first direction X and extends in the second direction Y.

In the optical device 1 configured as above, the panel 4 is formed such that the rigidity of thereof is continually increased from two side (or corner) portions in the first direction X toward the center. For this reason, when the optical member 2 is curved as the driving device 100 applies stress to the center portion thereof or the side portions thereof, the curvature of the center portion is prevented from becoming too small. Therefore, the flat optical member 2 can precisely be curved in a desired shape. Also, in this embodiment, the reinforcement member 3A is formed such that the thickness thereof is uniform but the dimension thereof in the second direction Y increases from the side (or corner) portions thereof in the first direction X toward the center. According to this configuration, the reinforcement member 3A can be manufactured from a plate material (a plate) having a uniform thickness; therefore, the reinforcement member 3A can be composed inexpensively. Also, the reinforcement member 3A having a different rigidity distribution can easily be manufactured from the plate material (the plate) having a uniform thickness. Further, the reinforcement member 3A is formed such that the width thereof (the dimension in the second direction Y) from the two corner portions toward the center is continually widened; therefore, the rigidity thereof is steadily increased from the two corner portions toward the center. For this reason, when the panel 4 is curved, the curvature of the panel 4 can be adjusted in the entire first direction X.

(Second Configuration Example of Reinforcement Member 3)

Figure 3A:
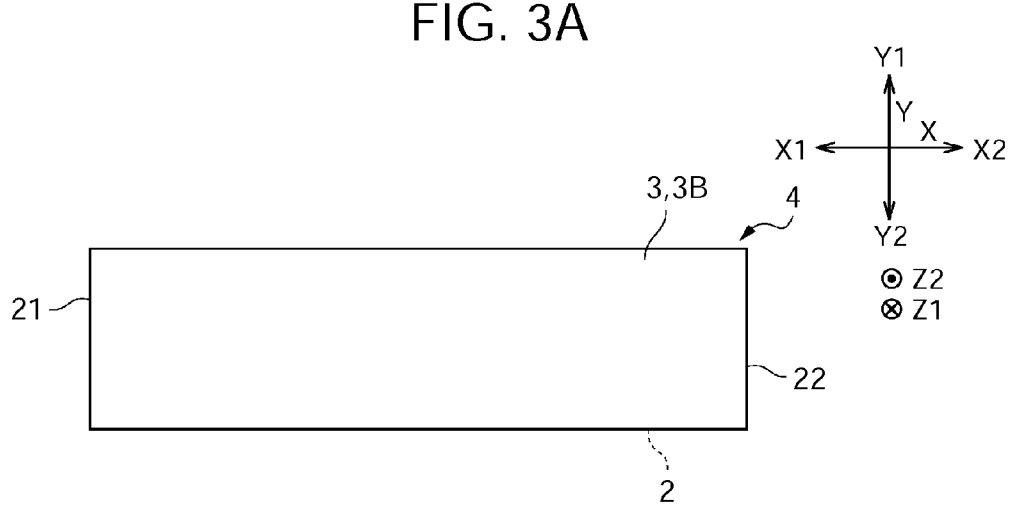
FIGS. 3A-3C are explanatory diagrams of the second configuration example of the reinforcement member used in the optical device to which at least an embodiment of the present invention is applied.
Figure 3B:
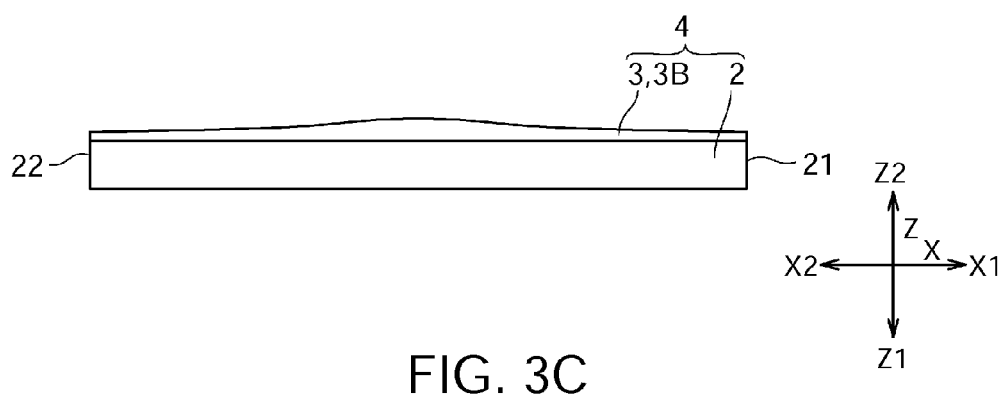
Figure 3C:
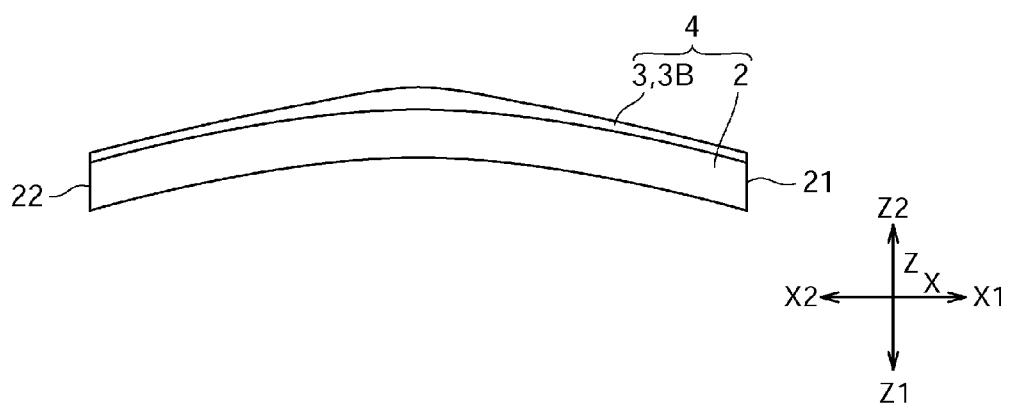
Figure 4A:
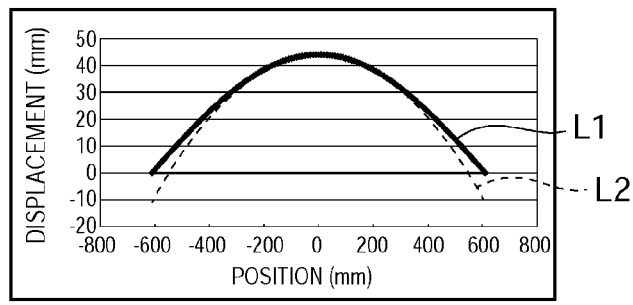
FIGS. 4A-4E are explanatory charts showing the evaluation results on the shapes of different samples when curved.
Figure 4B:
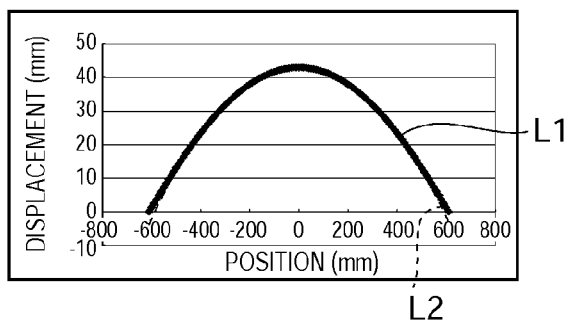
Figure 4C:
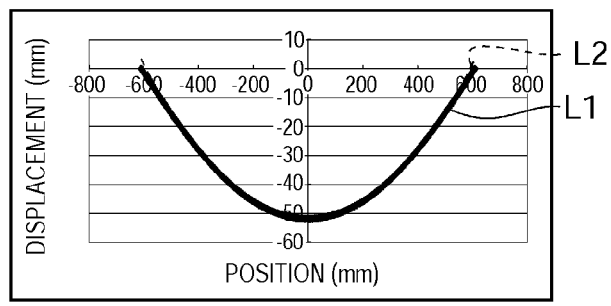
Figure 4D:
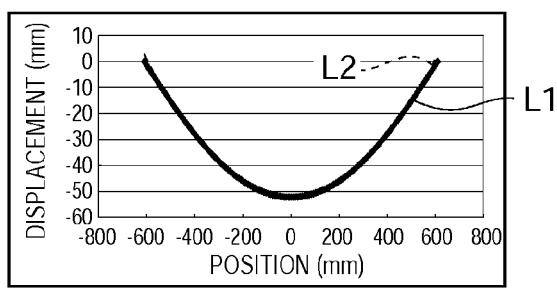
Figure 4E:
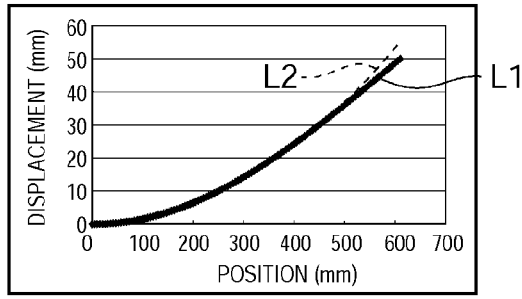
Figure 5A:
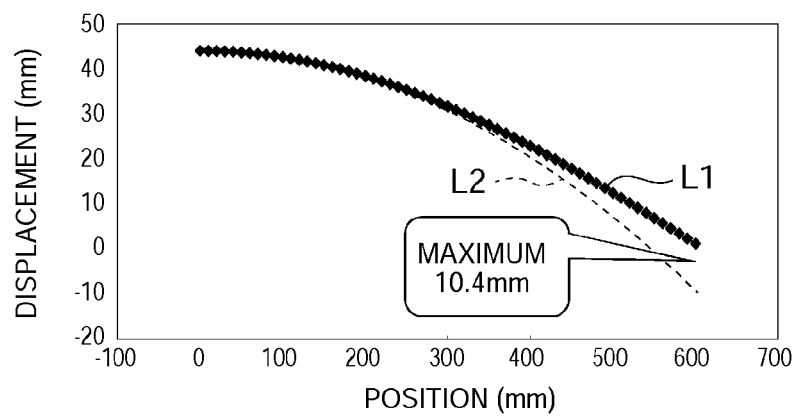
FIGS. 5A-5D are explanatory charts showing the evaluation results on the shape of the end portion of the different samples when curved.
Figure 5B:
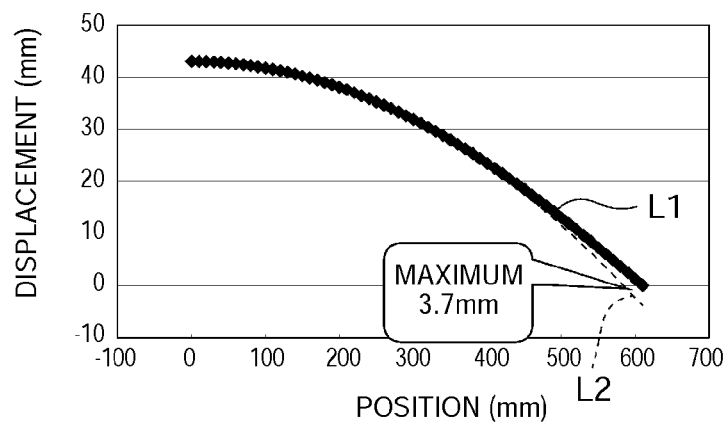
Figure 5C:
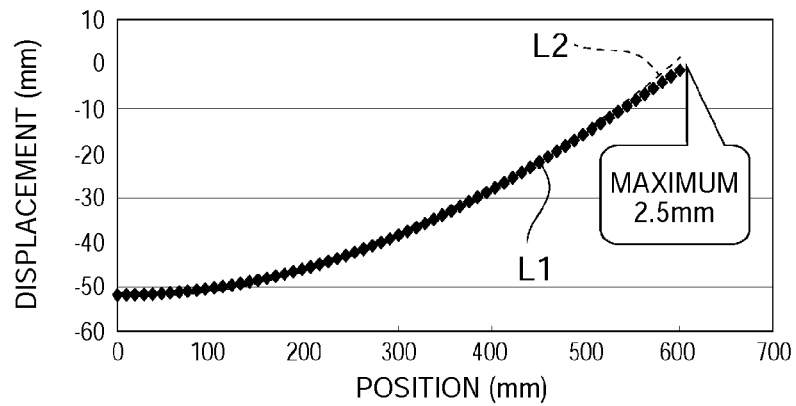
Figure 5D:
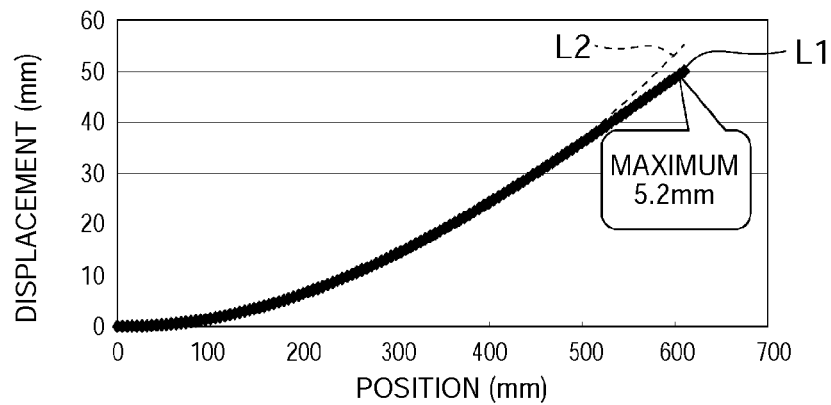

FIG. 3 is an explanatory diagram showing the second configuration example of the reinforcement member 3 used in the optical device 1 to which at least an embodiment of the present invention is applied: FIGS. 3 (*a*), (*b*) and (*c*) are respectively an explanatory diagram of the flat panel 4, viewed from the back side, an explanatory diagram of the flat panel 4, viewed from the top and an explanatory diagram of the panel 4 in the curved state, viewed from the top.

As shown in FIG. 3, the flat reinforcement member 3 (a reinforcement member 3B: the reinforcement plate) used in the optical device 1 of this embodiment is shaped in a quadrangle that is layered over the entire back surface of the optical member 2. Also, the reinforcement member 3B has a uniform thickness in the second direction; however, the thickness in the center area in the first direction X is more than that in the two side portions. For this reason, the reinforcement member 3B demonstrates more rigidity in the center area than the two side portions when curved in the thickness direction in the first direction X. More specifically described, the reinforcement member 3B has a uniform thickness at two side portions in the first direction X; however, the thickness is continually increased from halfway [between the side and the center] in the first direction X toward the center.

Thus, the panel 4 is formed such that the rigidity is steadily increased from two side portions in the first direction X toward the center. Therefore, when the optical member 2 is curved as the driving device 100 applies stress to the center portion or the side portions thereof, the curvature of the center portion is prevented from becoming too small. Therefore, the flat optical member 2 can precisely be curved in a desired shape. Also, the reinforcement member 3B is identical to the optical member 2 in size and shape. For this reason, the reinforcement member 3B can be bonded on the entire surface of the optical member 2 and used as a back cover for the optical member 2.

(Evaluation Results)

Next, the following samples 1 through 5 are prepared, and the shape of the optical member 2, which is 1200 mm long in the X direction, 69 mm long in the Y direction, 1.4 mm thick and has 72 GPa Young's modulus, is evaluated as the optical member 2 is curved in an arc with a 50 mm curvature (the curvature radius=3600 mm). The radian at that time is 19.1°.

Sample 1 (Comparison)

Figure 19A:
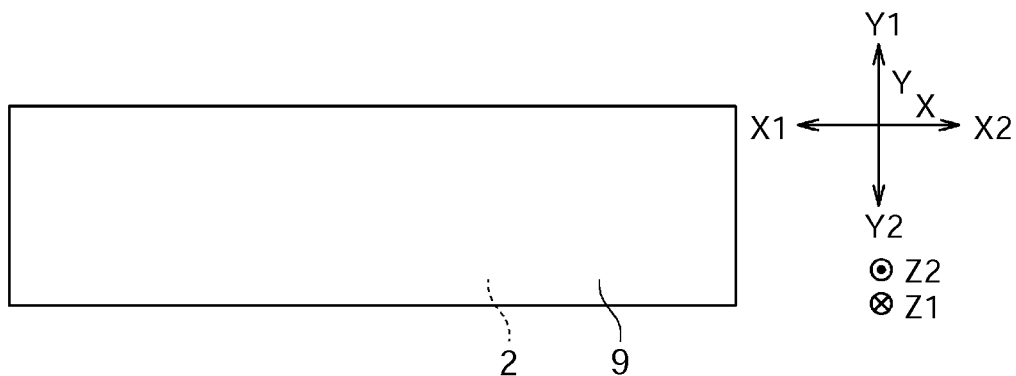
FIGS. 19A-19C are explanatory drawing of an optical device of a comparison example of at least an embodiment of the present invention.
Figure 19B:
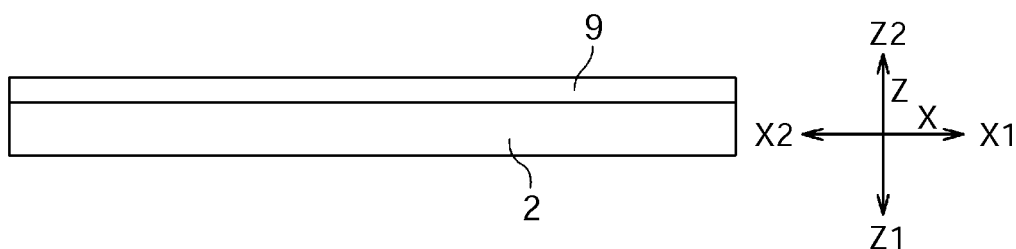
Figure 19C:
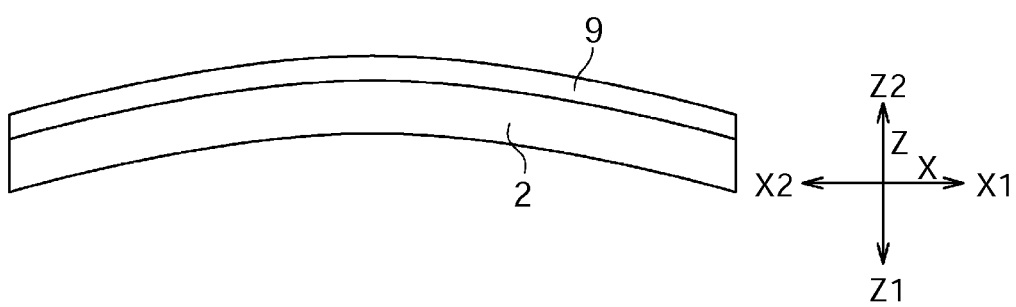

A back plate 9 (referring to FIG. 19) composed of a quadrangle zinc-coated steel plate is bonded on the back surface of the optical member 2. The curving method is one that applies stress to the [panel] from both sides in the X direction (the first direction), which will be described later referring to FIG. 15 (*a*), FIG. 16 and FIG. 17.

Sample 2 (Comparison)

The reinforcement member 3B composed of a zinc-coated steel plate shown in FIG. 3 is bonded on the back surface of the optical member 2. The curving method is one that applies stress to the [panel] from both sides in the X direction (the first direction), which will be described later referring to FIG. 15 (*a*), FIG. 16 and FIG. 17.

Sample 3 (Comparison)

The reinforcement member 3A composed of a zinc-coated steel plate shown in FIG. 2 is bonded on the back surface of the optical member 2. The curving method is one that applies stress to the [panel] from both sides in the X direction (the first direction), which will be described later referring to FIG. 15 (*a*), FIG. 16 and FIG. 17.

Sample 4 (Comparison)

A back plate 9 (referring to FIG. 19) composed of a quadrangle zinc-coated steel plate is bonded on the back surface of the optical member 2, and the reinforcement member 3A composed of a zinc-coated steel plate shown in FIG. 2 is further bonded on the back surface of the back plate 9. The curving method is one that applies stress to the [panel] from both sides in the X direction (the first direction), which will be described later referring to FIG. 15 (*a*), FIG. 16 and FIG. 17.

Sample 5 (Comparison)

A back plate 9 (referring to FIG. 19) composed of a quadrangle zinc-coated steel plate is bonded on the back surface of the optical member 2, and the reinforcement member 3A composed of a zinc-coated steel plate shown in FIG. 2 is further bonded on the back surface of the back plate 9. The curving method is one that applies stress to the panel from both sides in the Z direction (the third direction), which will be described referring later to FIG. 7 through FIG. 11.

Note that the reinforcement member 3B (FIG. 3) used for the evaluations has a 0.6 mm thickness for the thickest portion (the center area). Also, the reinforcement member 3A (FIG. 2) used in the evaluations is 0.6 mm thick, 20 mm in the width dimension W1 shown in FIG. 2, 20 mm in the length dimension L1, 10 mm in the width dimension W2 at the side portion and 24.5 mm in the width dimension W3 at the center area.

FIG. 4 is the explanatory chart showing the evaluation results on the shapes of the different samples when curved. FIG. 5 is an explanatory chart showing the evaluation results on the shapes of the side portion of the different samples when curved. Note that in FIG. 4 and FIG. 5 the solid line L1 indicates the shape of each sample when curved and the dotted line indicates the ideal arc. Also note that the relationship between the results shown and the samples in FIG. 4 and FIG. 5 is shown below. Note that FIG. 5 (*b*) is the result from the sample 2 (Embodiment 1) and from the sample 3 (Embodiment 2).

FIG. 4 (*a*) and FIG. 5 (*a*)=Sample 1 (Comparison)
FIG. 4 (*b*) and FIG. 5 (*b*)=Sample 2 (Embodiment 1)
FIG. 4 (*c*) and FIG. 5 (*b*)=Sample 3 (Embodiment 2)
FIG. 4 (*d*) and FIG. 5 (*c*)=Sample 4 (Embodiment 3)
FIG. 4 (*e*) and FIG. 5 (*d*)=Sample 5 (Embodiment 4)

It is understood from the comparison between the results shown in FIG. 4 (*a*) and FIG. 5 (*a*) and the results shown in FIG. 4 (*b*) through (*e*) and FIG. 5 (*b*) through (*d*) that, in the samples 2 through 5 associated with the embodiments 1 through 4 of the present invention, the panel 4 steadily increases its rigidity from two side portions in the first direction X toward the center because of the reinforcement member 3 (the reinforcement member 3A or 3B). Therefore, when the optical member 2 is curved as the driving device 100 applies stress to the center portion or side portions thereof, the curvature of the center portion is prevented from becoming too small. Accordingly, the flat optical member 2 can precisely be curved in a desired shape along the circle having desired curvature. In the results of the comparison (Sample 1) shown in FIG. 4 (a) and FIG. 5 (a), for example, the error was 10.4 mm at maximum while the error was 5.2 mm at maximum in the results of the embodiments 1 through 4 (Samples 2 through 5) shown in FIG. 4 (b) through (e) and FIG. 5 (b) through (d).

(Third Configuration Example of Reinforcement Member 3)

Figure 6A:
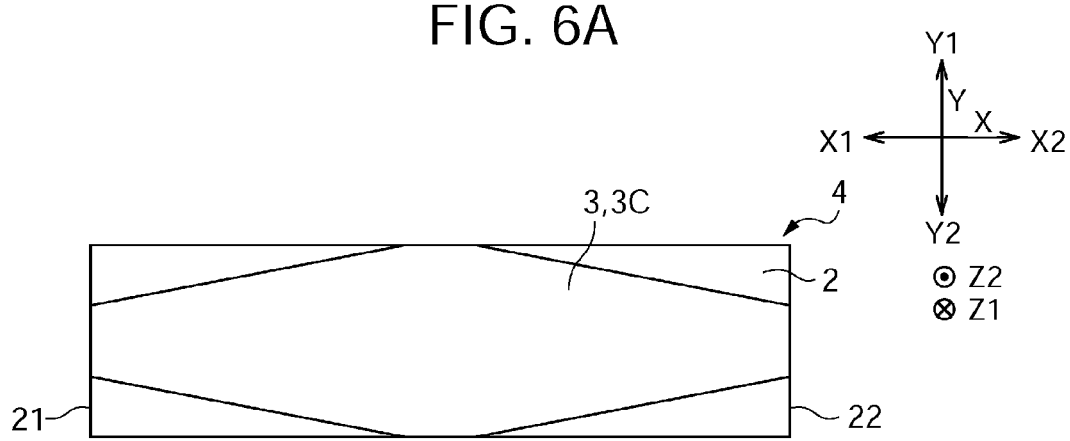
FIGS. 6A-6C are explanatory diagrams of the third configuration example of the reinforcement member used in the optical device to which at least an embodiment of the present invention is applied.
Figure 6B:
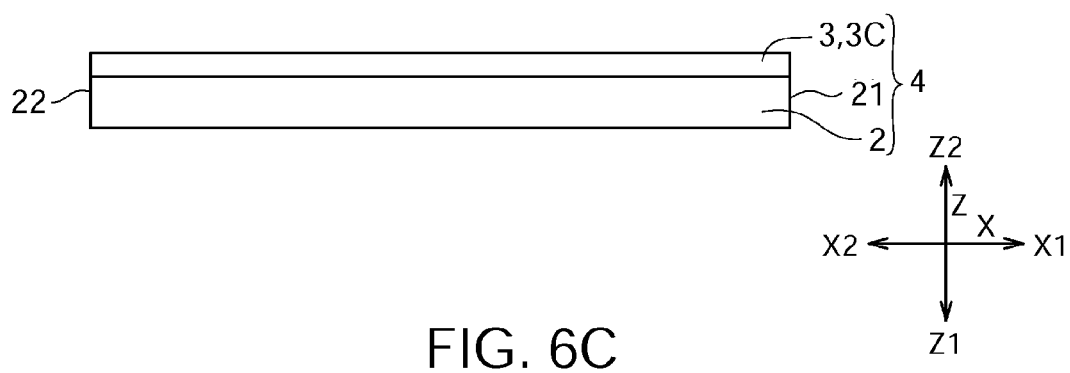
Figure 6C:
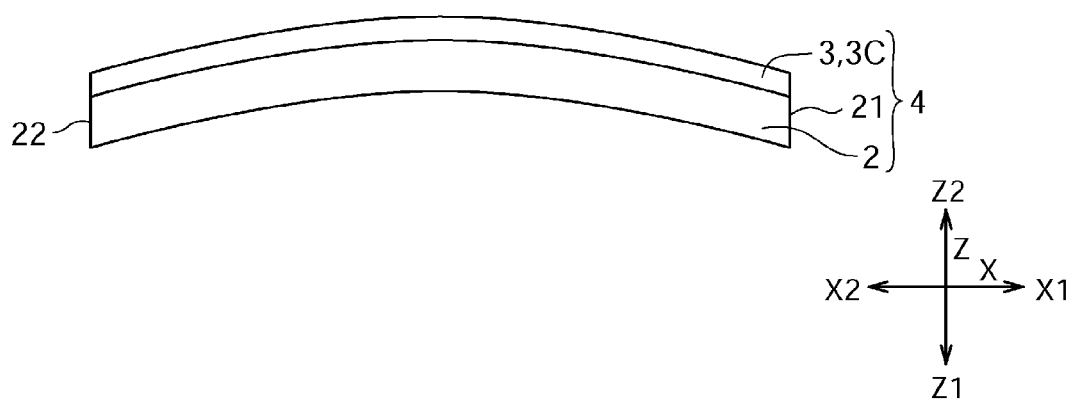

FIG. 6 is an explanatory diagram showing the third configuration example of the reinforcement member 3 used in the optical device 1 to which at least an embodiment of the present invention is applied: FIGS. 6 (a), (b) and (c) are respectively an explanatory diagram of the flat panel 4, viewed from the back side, an explanatory diagram of the flat panel 4, viewed from the top and an explanatory diagram of the panel 4 in the curved state, viewed from the top.

As shown in FIG. 6, the flat reinforcement member 3 (a reinforcement member 3C: the reinforcement plate) used in the optical device 1 of this embodiment has a uniform thickness within the in-plane direction. Here, the reinforcement member 3 (a reinforcement member 3C) is in a rhombus shape in which the dimension thereof in the second direction Y is steadily widened from the two side portions to the center. Therefore, the reinforcement member 3C demonstrates more rigidity in the center area than the two side portions when the optical member 2 is curved in the thickness direction from the first direction X within the in-plane direction. Thus, the panel 4 is formed such that its rigidity steadily increases from the two side portions toward the center in the first direction X; therefore, the flat optical member 2 can precisely be curved in a desired shape, providing the same effect as the reinforcement member 3A which was described referring to FIG. 2.

(First Example of Driving Device)

Figure 7:
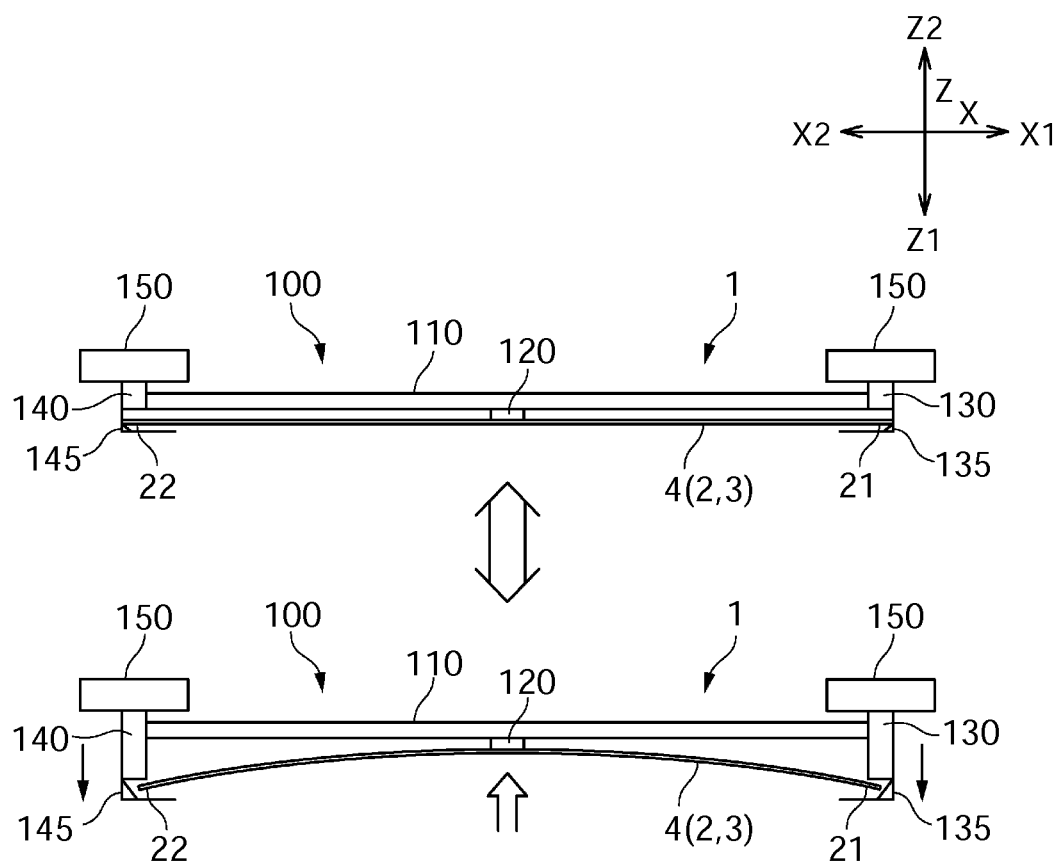
FIG. 7 is a configuration diagram of the first example of a driving device of the optical device to which at least an embodiment of the present invention is applied.

FIG. 7 is a configuration diagram of the first example of the driving device 100 of the optical device 1 to which at least an embodiment of the present invention is applied, showing the panel 4 (the optical member 2) in the flat state and in the curved state.

In FIG. 7, the driving device 100 has a fixed body 110, a center holding portion 120 for holding the center of the panel 4 in the first direction X from the back side (on the other side Z2 in the third direction), a first side holding portion 130 for holding the first side portion 21 of the panel 4 on one side X1 in the first direction X, and a second side holding portion 140 for holding the second side portion 22 of the panel 4 on the other side X2 in the first direction X. The driving device 100 also has a mechanism portion 150 that moves the first side holding portion 130 and the second side holding portion 140 relative to the center holding portion 120 in the thickness direction of the panel 4 (in the Z direction, that is the third direction). In this embodiment, the mechanism portion 150 has a motor as a driving source and a transmission mechanism that transmits the driving force of the motor to move the first side holding portion 130 and the second holding portion 140 relative to the center holding portion 120 in the thickness direction of the panel 4; the transmission mechanism includes a reduction gear mechanism.

In this embodiment, the center holding portion 120 is arranged on the fixed body 110. On the other hand, the first side holding portion 130 and the second side holding portion 140 are supported by the fixed body 110 with the help of the mechanism portion 150 and is movable in the thickness direction of the panel 4. For this reason, the mechanism portion 150 displaces the first side holding portion 130 and the second side holding portion 140 with respect to the center holding portion 120 in the thickness direction of the panel 4.

In the optical device 1 configured as above, the panel 4 is set under the condition that the first side holding portion 130 and the second side holding portion 140 are positioned on the other side Z2 in the third direction Z and aligned with the center holding portion 120 when viewed in the X direction (the first direction). More specifically described, two side portions of the panel 4 in the X direction (the first direction) are held by the first side holding portion 130 and the second side holding portion 140, and the center of the reinforcement member 3 of the panel 4 and the center holding portion 120 are fixed together. At that time, the panel 4 is in the flat state. Formed respectively in the first side holding portion 130 and the second side holding portion 140 are slit-like receiving portions 135 and 145 which respectively have an opening larger than the thickness of the panel 4; therefore, the two side portions of the panel 4 in the X direction (the first direction) can be displaced to some degree inside of [the openings of] the receiving portions 135 and 145 of the first side holding portion 130 and the second side holding portion 140. Then, when the first side holding portion 130 and the second side holding portion 140 are displaced to one side Z1 in the third direction Z by the mechanism portion 150, the panel 4 is curved to the back side since the center portion of the panel 4 in the first direction X is fixed in the third direction Z by the center holding portion 120.

When the first side holding portion 130 and the second holding portion 140 are returned to the other side Z2 in the third direction Z, the panel 4 in the curved state 4 returns to the flat state.

(More Concrete Configuration Example of First Example of the Driving Device)

Figure 8A:
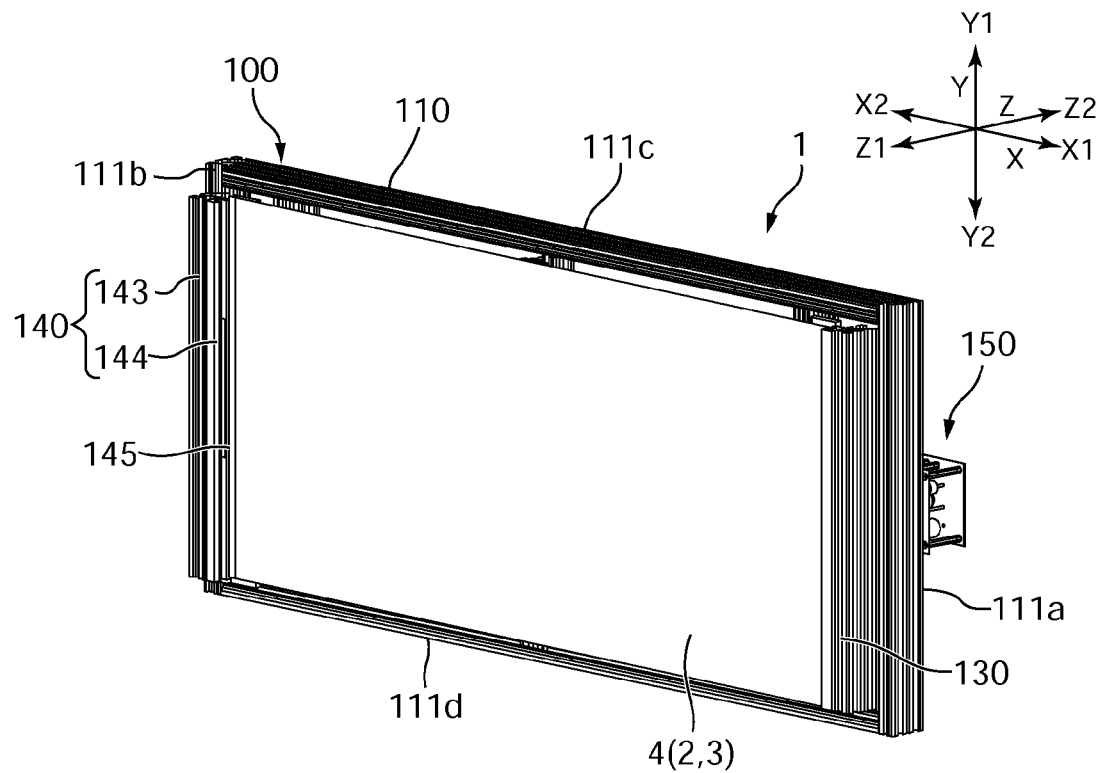
FIGS. 8A-8B are explanatory diagrams of the concrete composition of the driving device shown in FIG. 7.
Figure 8B:
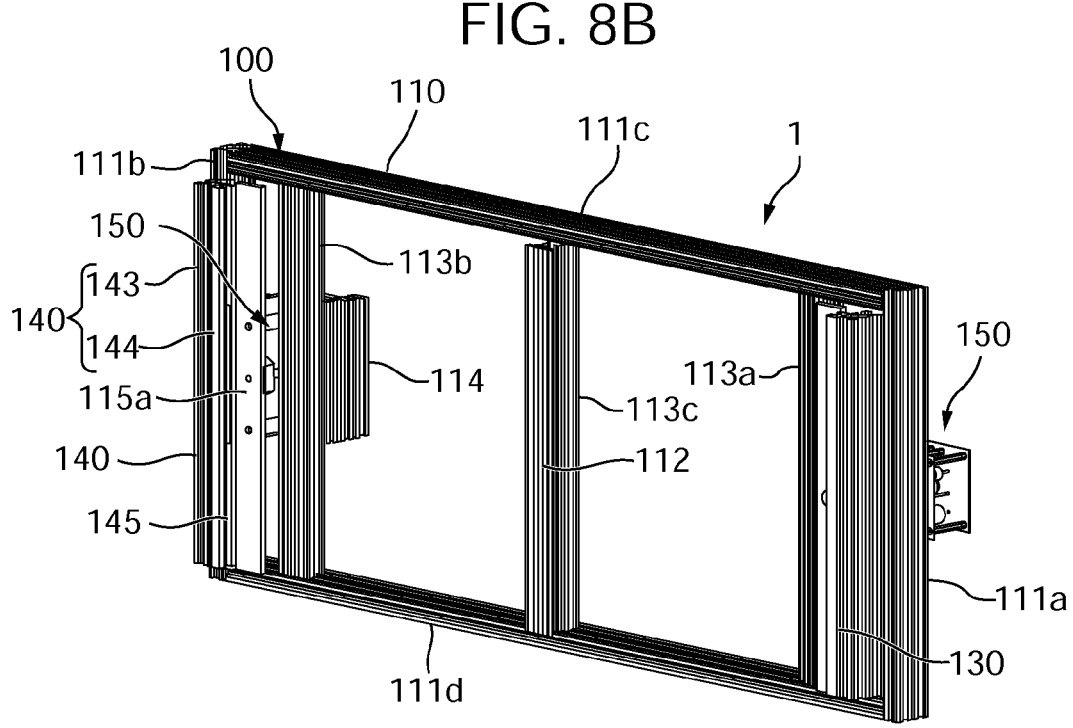
Figure 9A:
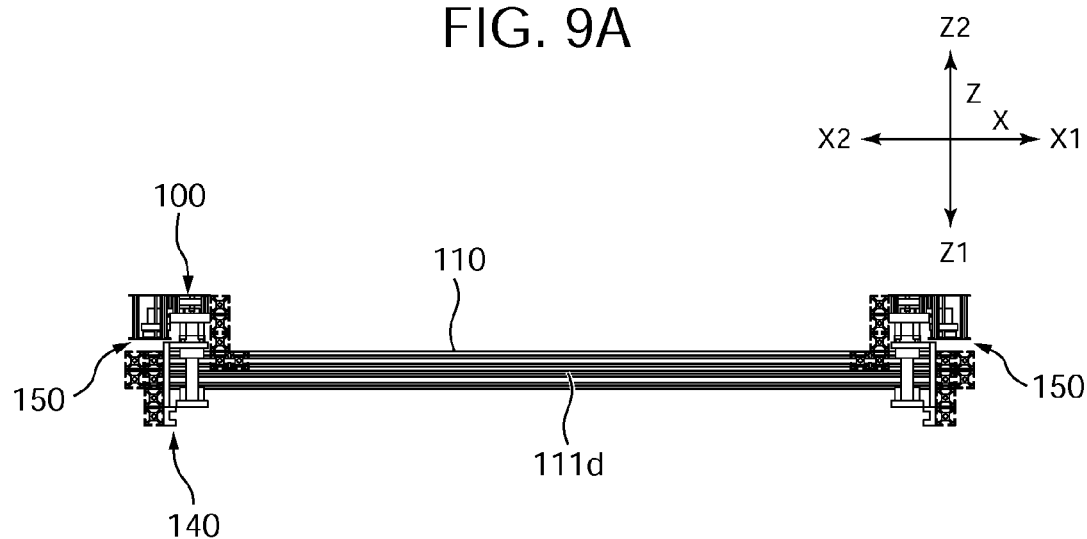
FIGS. 9A-9B are explanatory diagrams of the plane composition of the driving device shown in FIG. 7.
Figure 9B:
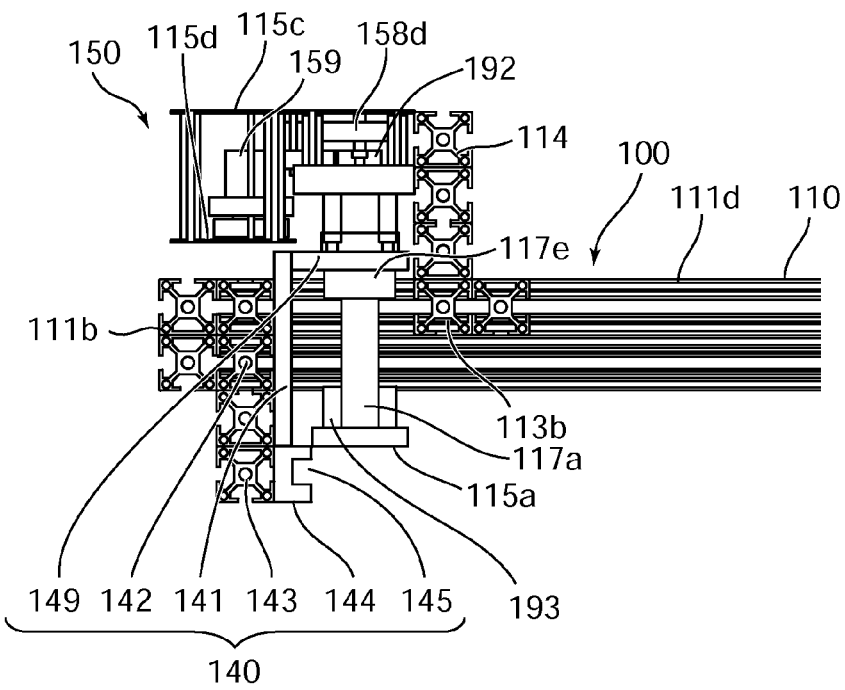
Figure 10A:
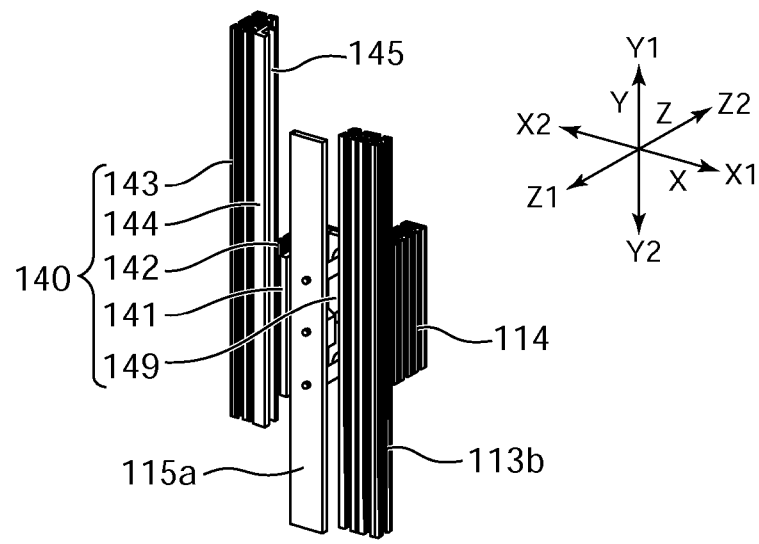
FIGS. 10A-10B are explanatory diagrams of a mechanism portion, etc. arranged on the other side in the first direction in the driving device shown in FIG. 8.
Figure 10B:
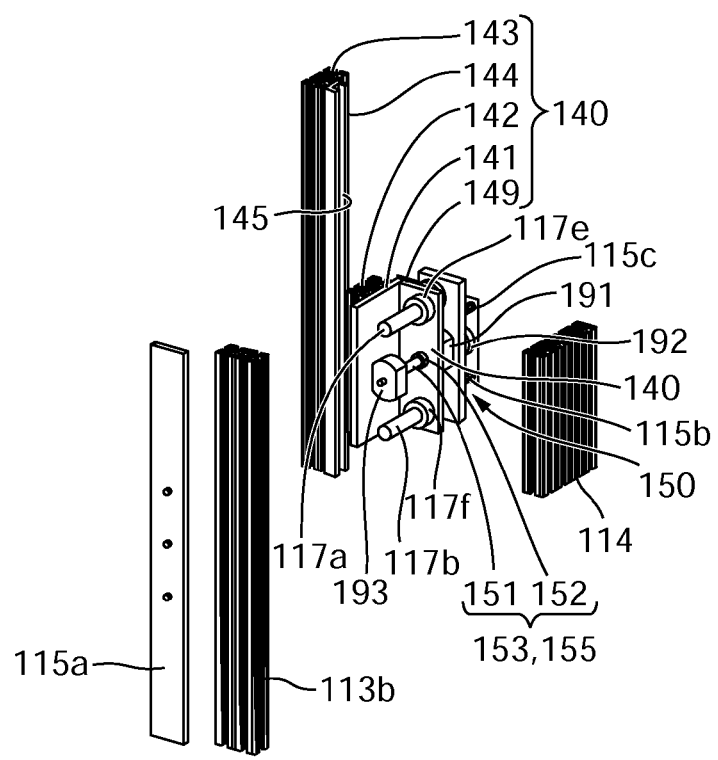
Figure 11A:
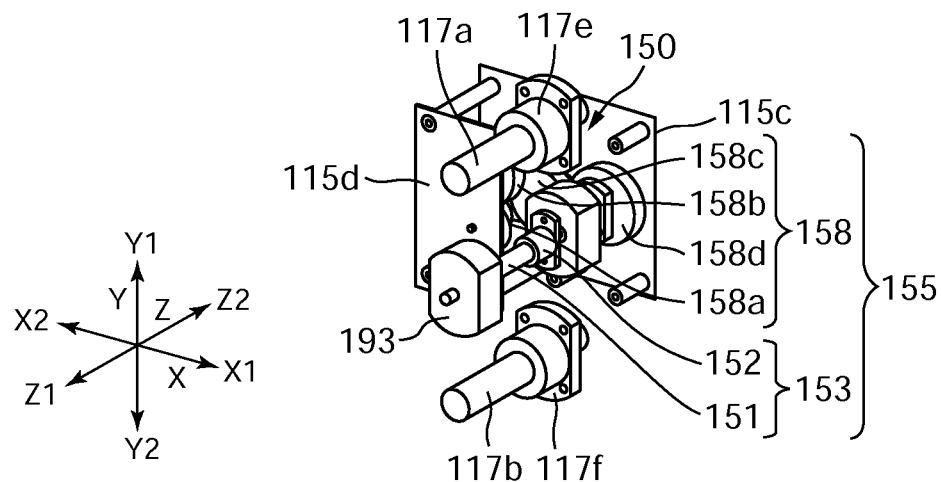
FIGS. 11A-11B are explanatory diagrams of a transmission mechanism in the mechanism portion arranged on the other side in the first direction in the driving device shown in FIG. 8.
Figure 11B:
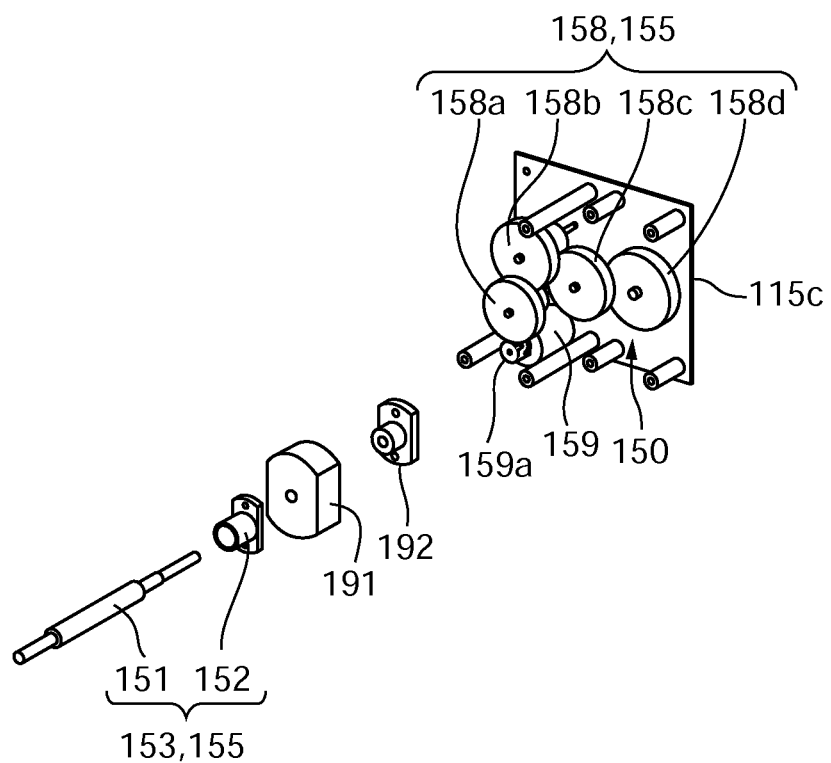

FIG. 8 is an explanatory diagram showing the more concrete configuration of the driving device 100 shown in FIG. 7: FIGS. 8 (a) and (b) are respectively a perspective view of the optical device 1, viewing the front thereof from the diagonal direction, and a perspective view of the optical device 1 without the panel 4. FIG. 9 is an explanatory diagram showing a plan configuration of the driving device 100 shown in FIG. 8: FIGS. 9 (a) and (b) are respectively a plan view of the driving device 100 having an upper frame 111c removed, viewed from one side Y1 in the second direction Y, and a plan view of the driving device, having the other side X2 in the first direction X magnified. FIG. 10 is an explanatory diagram of the mechanism portion 150, etc. arranged on the other side X2 in the first direction X in the driving device 100 shown in FIG. 8: FIGS. 10 (a) and (b) are respectively a perspective view of the mechanism portion 150 and a perspective view of the disassembled mechanism portion 150. FIG. 11 is an explanatory diagram of the transmission mechanism 155, etc. of the mechanism portion 150 positioned on the other side X2 in the first direction X in the driving device 100 shown in FIG. 8: FIGS. 11 (a) and (b) are respectively a perspective view of the transmission mechanism 180, etc. and a perspective view of the disassembled transmission mechanism 180, etc. Note that in FIG. 8 (a), the solid line shows the panel 4 in the flat state while the dot-dash line shows the panel 4 in the curved state.

In the optical device 1 shown in FIGS. 7, 8 and 9, the driving device 100 has a fixed body 110 positioned on the back side (on the other side Z2 in the third direction Z) of the panel 4, the center holding portion 120 for holding the center of the panel 4 in the first direction X from the back side of the panel 4 (from the other side Z2 in the third direction Z), the first side holding portion 130 for holding the first side portion 21, one of the two side portions, of the panel 4 in the first direction X and the second side holding portion 140 for holding the second side portion 22, the other of the side portions, of the panel 4 in the first direction X. In this embodiment, the center holding portion 120 is provided to the fixed body 110, and the driving device 100 has a mechanism portion 150 that displaces the first side holding portion 130 and the second side holding portion 140 with respect to the center holding portion 120 in the thickness direction of the panel 4.

In this embodiment, the fixed body 110 further has vertical frames 111a and 111b which are opposed in the first direction X, an upper frame 111c which connects the corner portions of the vertical frames 111a and 111b on one side Y1 in the second direction Y and a lower frame 111d which connects the corner portions of the vertical frames 111a and 111b on the other side Y2 in the second direction Y. The fixed body 110 also includes a connection frame 113a which extends in the second direction Y at the position adjacent to the vertical frame 111a on the other side X2 in the first direction X and joined to the upper frame 111c and the lower frame 111d and a connection frame 113b which extends in the second direction Y at the position adjacent to the vertical frame 111b on one side X1 in the first direction X and joined to the upper frame 111c and the lower frame 111d. The fixed body 110 also has a connection frame 113c which extends in the second direction Y at the center in the first direction X and joined to the upper frame 111c and the lower frame 111d, and the center holding portion 120 is configured on the surface of the connection frame 113c on one side Z1 in the third direction Z for holding the center of the panel 4 in the first direction X from the back side of the panel 4 (from the other side Z2 in the third direction Z).

A pair of mechanism portions 150 is formed on the back side of the panel 4 to drive the first side holding portion 130 and the second side holding portion 140 respectively in the third direction Z. The pair of mechanism portions 150 has the identical configuration. Therefore, the configuration of the mechanism portion 150 that drives the second side holding portion 140 in the third direction Z is described, and the description of the configuration of the mechanism portion 150 that drives the first side holding portion 130 in the third direction Z is omitted.

As shown in FIG. 8 through FIG. 11, the fixed body 110 has a fixing-support plate 114 which is fixed to the connection frame 113b and a first stationary plate 115a which is joined to the upper frame 111c and the lower frame 111d by both ends thereof in the second direction Y. Fixed to the fixing-support plate 114 is a second stationary plate 115b which opposes the first stationary plate 115a at the other side Z2 in the third direction Z; fixed to the second stationary plate 115b is a third stationary plate 115c which opposes the second stationary plate 115b at a predetermined distance at the other side Z2 in the third direction Z. Fixed to the third stationary plate 115c is a fourth stationary plate 115d that opposes the third stationary plate 115c at a predetermined distance at one side Z1 in the third direction Z. In the fixed body 110, also, a guide shaft 117a is fixed between the first stationary plate 115a and the third stationary plate 115c and a guide shaft 117b is fixed between the first stationary plate 115a and the second stationary plate 115b.

In this embodiment, a movable plate 149 is supported movable in the second direction Y with respect to the guide shaft 117a and the guide shaft 117b through bearings 117e and 117f, and a movable frame 143 that extends in the second direction Y is joined to the movable plate 149 through movable-plate-support plates 141 and 142. Also, a movable holding frame 144 that extends in the second direction Y is fixed on the surface of the movable frame 143 on one side X1 in the first direction X, and the slit-like receiving portion 145 which extends in the second direction Y to support the second side portion 22 of the panel 4 is configured on the surface of the movable holding frame 144 on one side X1 in the first direction X. The second side holding portion 140 that can be displaced in the third direction Z is configured by the movable plate 149, the movable-plate-support plates 141 and 142, the movable frame 143 and the movable holding frame 144 which are configured as above.

The mechanism portion 150 is configured by a motor 159 as a driving source and a transmission mechanism 155 for transmitting the rotation of the motor 159 to the second side holding portion 140 to drive the second side holding portion 140 in the Z direction (the third direction). In this embodiment, the transmission mechanism 155 has a reduction gear mechanism 158 and a feed screw mechanism 153. The reduction gear mechanism 158 has a first gear 158a equipped with a large diameter gear which meshes with a motor pinion 159a, a second gear 158b equipped with a large diameter gear which meshes with a small diameter gear of the first gear 158a, a third gear 158c equipped with a large diameter gear which meshes with a small diameter gear of the second gear 158b, and a fourth gear 158d equipped with a large diameter gear which meshes with a small diameter gear of the third gear 158c. The feed screw mechanism 153 is equipped with a screw shaft 151 which rotates together with the fourth gear 158d and a nut 152 which couples with the screw shaft 151, and the nut 152 is joined to the movable plate 149. Note that the screw shaft 151 is supported by a bearing 192 arranged on the second stationary plate 115b, and that a thrust bearing 193 fixed on the first stationary plate 115a and a thrust bearing 191 arranged on the second stationary plate 115b are provided for the movable plate 149.

In the mechanism portion 150 of the driving device 100 configured as above, the motor 159 is a DC motor with blush in which the motor shaft is rotatable in both directions; when the motor shaft is rotated in one direction in the motor 159, for example, the rotation is transmitted to the screw shaft 151 of the feed screw mechanism 153 through the reduction gear mechanism 158; as a result, the second side holding portion 140 is displaced toward one side Z1 in the third direction Z. On the other hand, when the motor shaft is rotated in the other direction in the motor 159, the rotation is transmitted to the screw shaft 151 of the feed screw mechanism 153 through the reduction gear 158; as a result, the second side holding portion 140 is displaced toward the other side Z2 in the third direction Z. Note that, although a DC motor with blush is used in this embodiment, the present invention is not limited to this, but a stepping motor, etc. may be used, for example.

As described above, the driving device 100 has the motor 159 as a driving source in this embodiment; therefore, the driving device 100 can be actuated when simply connected to a power source. Therefore, the installation of the optical device 1 is easy. Also, the driving device 100 includes the reduction gear mechanism 158 for reducing and transmitting the driving force of the motor 159; therefore, the optical member 2 can be curved by using the small-size motor 159.

(Second Example of Driving Device)

Figure 12A:
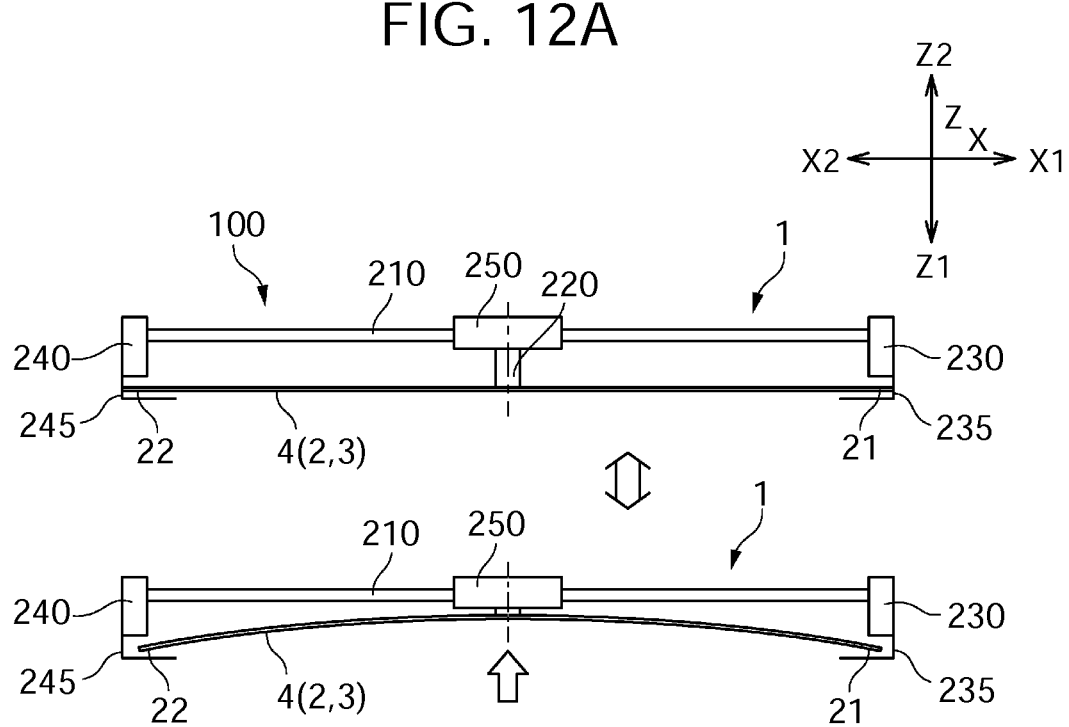
FIGS. 12A-12B are configuration diagrams of the second example of the driving device of the optical device to which at least an embodiment of the present invention is applied.
Figure 12B:
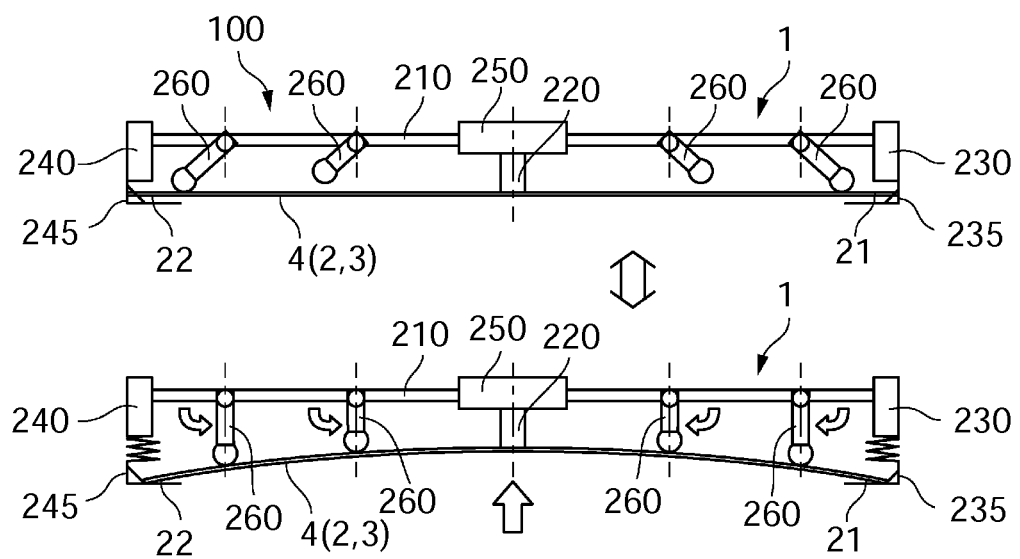

FIG. 12 is a configuration diagram showing the second example of the driving device 100 of the optical device 1 to which at least an embodiment of the present invention is applied: FIG. 12 (*a*) shows the panel 4 (the optical member 2) in the flat state and in the curved state. FIG. 12 (*b*) shows the panel 4 (the optical member 2) in the flat state and in the curved state in a modification example of the second configuration example of the driving device 100.

In FIG. 12 (*a*), the driving device 100 has a fixed body 210, a center holding portion 220 for holding the center of the panel 4 in the first direction X from the back side of the panel 4 (from the other side Z2 of the third direction Z), a first side holding portion 220 for holding the first side portion 21 of the panel 4 on one side X1 in the first direction X, a second side holding portion 240 for holding the second side portion 22 of the panel 4 on the other side X2 in the first direction X, in the same manner as the configuration example described referring to FIG. 7. The driving device 100 also has a mechanism portion 250 which moves the center holding portion 220 in the panel 4 thickness direction (in the Z direction, that is in the third direction) relative to the first side holding portion 230 and the second side holding portion 240. In this embodiment, the mechanism portion 250 has a motor as a driving source and a transmission mechanism which transmits the driving force of the motor to move the first side holding portion 230 and the second side holding portion 240 in the panel 4 thickness direction relative to the center holding portion 220.

In this embodiment, the first side holding portion 230 and the second side holding portion 240 are arranged on the fixed body 210. On the other hand, the center holding portion 220 is supported by the fixed body 210 through the mechanism portion 250 and is movable in the thickness direction of the panel 4. For this reason, the mechanism portion 250 displaces the center holding portion 220 in the thickness direction of the panel 4 with respect to the first side holding portion 230 and the second side holding portion 240.

In the optical device 1 configured as above, the panel 4 is set under the condition where the center holding portion 220 is positioned on one side Z1 in the third direction Z and the first side holding portion 230 and the second side holding portion 240 are aligned with the center holding portion 220 when viewed in the X direction (the first direction). More specifically described, the two side portions of the panel 4 in the X direction (the first direction) are held by the first side holding portion 230 and the second side holding portion 240 respectively, and the center of the reinforcement member 3 and the center holding portion 230 are fixed together in the panel 4. At that time, the panel 4 is flat. In the first side holding portion 230 and the second side holding portion 240, the slit-like receiving portions 235 and 245 respectively having an opening larger than the thickness dimension of the panel 4 are respectively formed; therefore, the two side portions of the panel 4 in the X direction (the first direction) can be displaced to some extent inside of the receiving portions 235 and 245 of the first side holding portion 230 and the second side holding portion 240. Then, the center holding portion 220 is displaced to the other side Z2 in the third direction Z by the mechanism portion 250; because the positions of the two side portions of the panel 4 in the first direction X are fixed by the first side holding portion 230 and the second side holding portion 240, the panel 4 becomes curved to the back side. Also, when the center holding portion 220 is returned back to one side Z1 in the third direction by the mechanism portion 250, the panel 4 in the curved state returns to the flat state.

Note that, as shown in FIG. 12 (*b*), support members 260 may be provided on the back side of the panel 4 (on the other side Z2 in the third direction Z) to support the back side of the panel 4 when the center holding portion 220 is displaced to the other side Z2 in the third direction Z to curve the panel 4. At that time, the support members 260 are swingably supported by the fixed body 210: when the panel 4 is in the flat state, they are retracted from the positions of contact with the back side of the panel 4; when the panel 4 is in the curved state, they position themselves to make contact with the back side of the panel 4. In this embodiment, the support member 260 is provided in multiple locations in the first direction X, and the dimension of the support member 260 is determined according to the curvature of the panel 4. Therefore, the precision of the curve shape of the panel 4 can be improved.

Also, in this embodiment, the first side holding portion 230 and the second side holding portion 240 are fixed to the fixed body 210 through elastic members 270 such as springs and energized toward the other side Z2 in the third direction Z. This ensures contact between the panel 4 and the support members 260.

(More Concrete Configuration Example of Second Example of Driving Device 100)

Figure 13A:
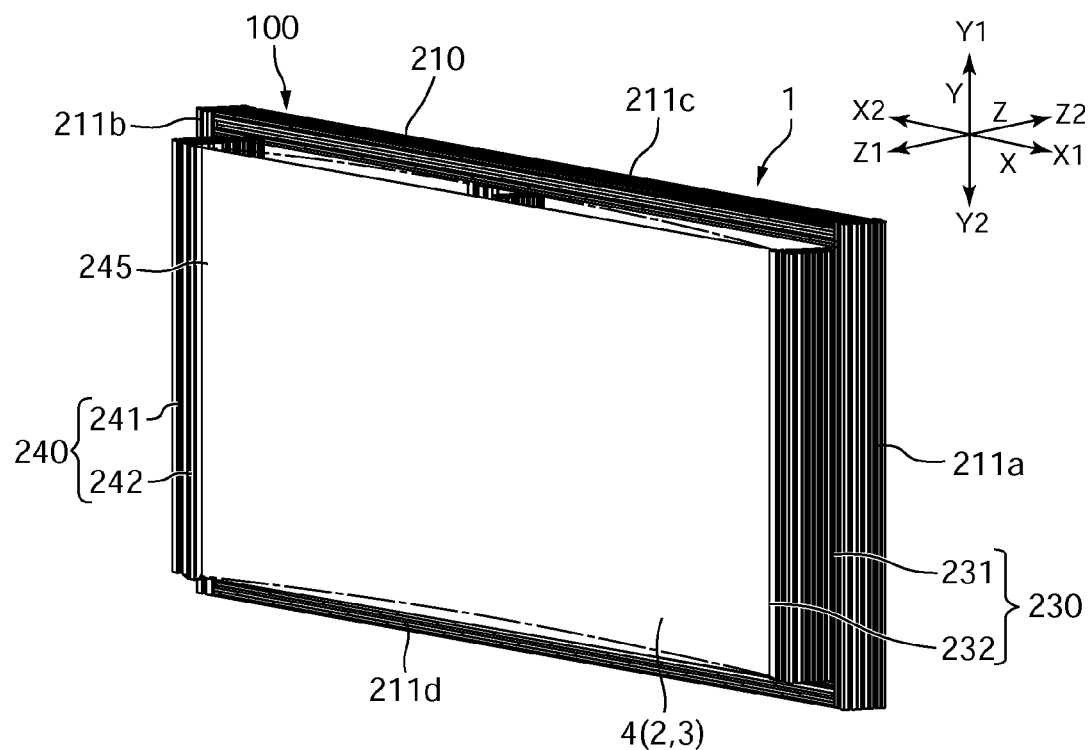
FIGS. 13A-13B are explanatory diagrams of the concrete composition of the driving device shown in FIG. 12 (a).
Figure 13B:
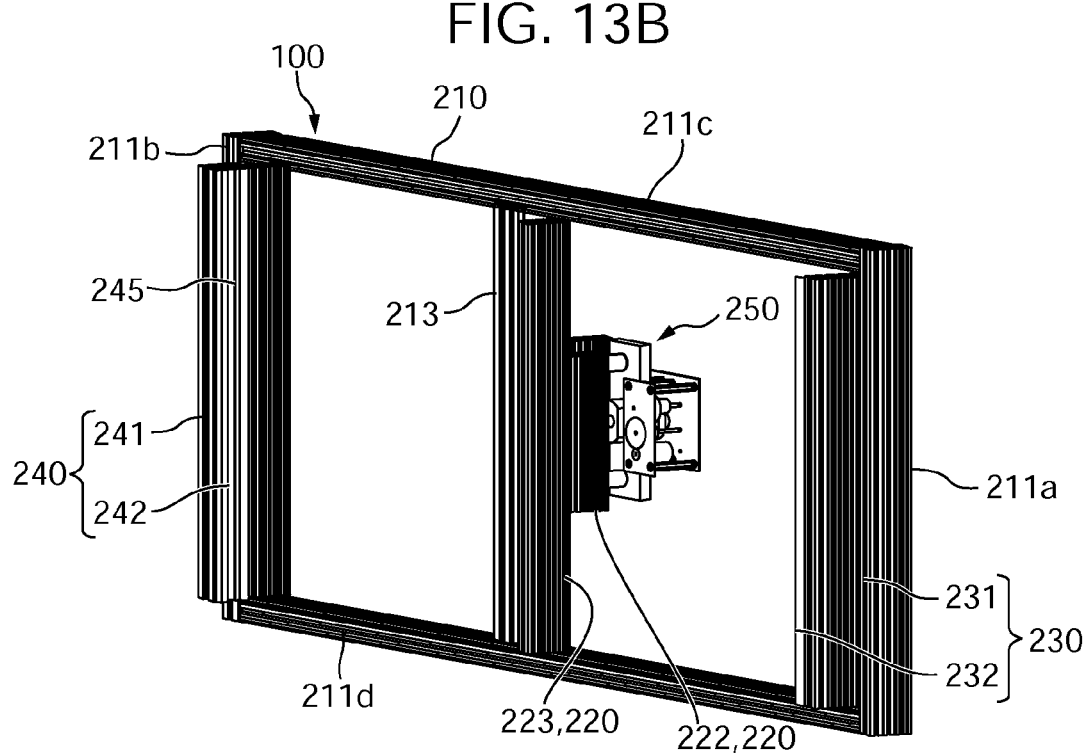
Figure 14A:
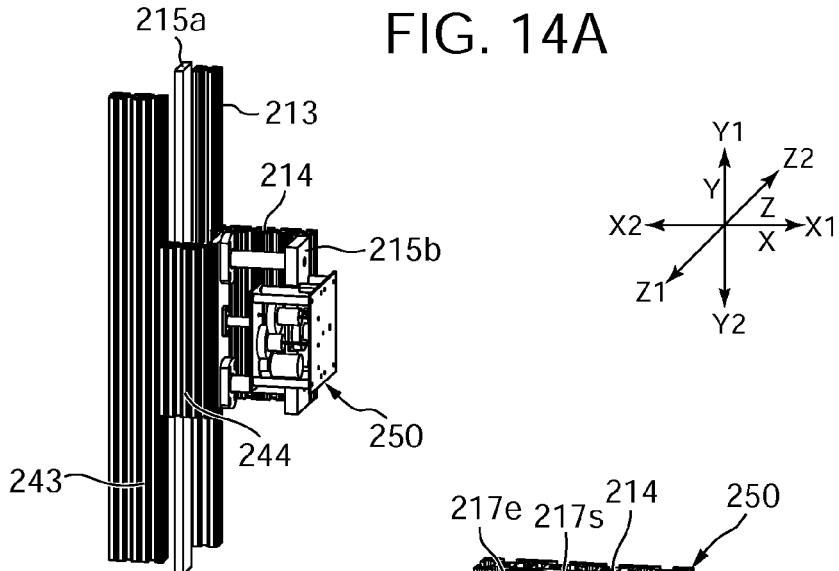
FIGS. 14A-14C are perspective views of the mechanism portion of the driving device shown in FIG. 13, viewing the back side thereof from the diagonal direction.
Figure 14B:
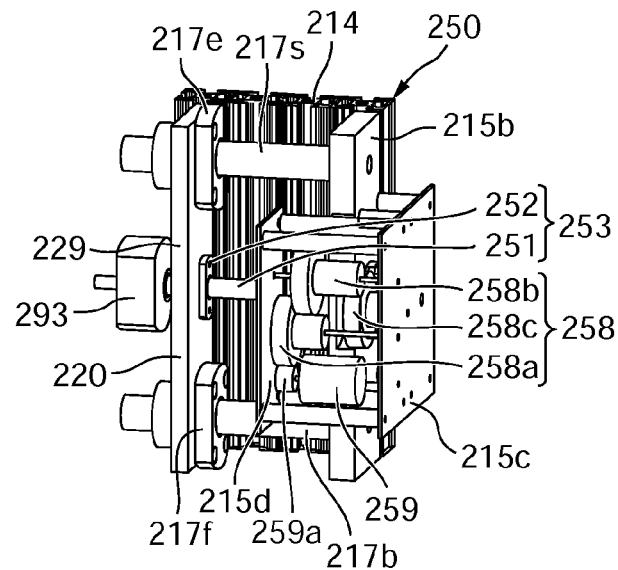
Figure 14C:
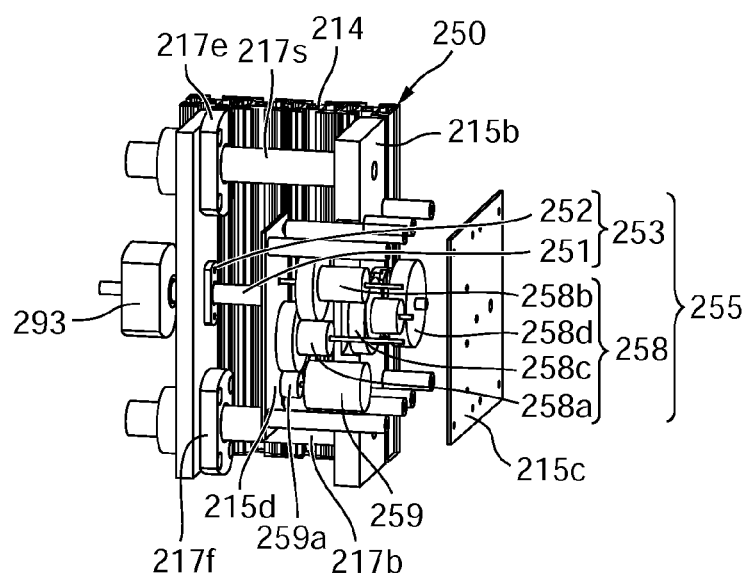

FIG. 13 is an explanatory diagram showing the more concrete configuration of the driving device 100 shown in FIG. 12 (*a*): FIGS. 13 (*a*) and (*b*) are respectively a perspective view of the optical device 1, viewing the front from the diagonal direction and a perspective view of the optical device 1 without the panel 4. FIG. 14 is a perspective view of the mechanism portion 250, etc. of the driving device 100 shown in FIG. 13, viewing it diagonally from the back side: FIGS. 14 (*a*), (*b*) and (*c*) are respectively a perspective view of the mechanism portion 250, etc., a perspective view of the transmission mechanism, etc., of the mechanism portion 250 and a perspective view of the motor, etc. of the mechanism portion 250. Note that FIG. 13 (*a*) uses the solid line for the panel 4 in the flat state and the dot-dash line for the panel 4 in the curved state.

In the optical device 1 shown in FIG. 13, the driving device 100 has the fixed body 210 positioned on the back side of the panel 4 (on the other side Z2 in the third direction Z), the center holding portion 220 for holding the center of the panel 4 in the first direction X from the back side of the panel 4 (from the other side Z2 in the third direction Z), the first side holding portion 230 for holding the first side portion 21, one of the side portions of the panel 4 in the first direction X, and the second side holding portion 240 for holding the second side portion 22, the other of the side portions of the pane 4 in the first direction X. The driving device 100 also has the mechanism portion 250 which moves the center holding section 220 in the thickness direction of the panel 4 (in the Z direction, that is the third direction) relative to the first side holding portion 230 and the second edge portion 240.

In this embodiment, the fixed body 210 has vertical frames 211*a* and 211*b* that are opposed to each other in the first direction X, an upper frame 211*c* that connects the corner portions of the vertical frames 211*a* and 211*b* on one side Y1 in the second direction Y, and a lower frame 211*d* that connects the corner portions of the vertical frames 211*a* and 211*b* on the other side Y2 in the second direction Y. The fixed body 210 also has a connecting frame 213 that extends in the second direction Y at the center in the first direction X and is joined to the upper frame 211c and the lower frame 211d.

The second side holding portion 240 has a fixed frame 241 joined to the vertical frame 211b and a fixed holding frame 242 fixed on the surface of the fixed frame 241 on one side X1 in the first direction X, and a slit-like receiving portion 245 that extends in the second direction Y to hold the second side portion 22 of the panel 4 is configured on the surface of the fixed holding frame 242 on one side X1 in the first direction X. In the same manner as the second side holding portion 240, the first side holding portion 230 has a fixed frame 231 joined to the vertical frame 211a and a fixed holding frame 232 fixed on the surface of the fixed frame 231 on the other side X2 in the first direction X, and a slit-like receiving portion 235 that extends in the second direction Y to hold the first side portion 21 of the panel 4 (see FIG. 12) is configured on the surface of the fixed holding portion 232 on the other side X2 in the first direction X. On the back side of the panel 4, the mechanism portion 250 is formed for driving the center holding portion 220 in the third direction Z.

As shown in FIG. 14, to configure the mechanism portion 250, the fixed body 210 has a fixing-support plate 214 fixed to the connection frame 213b, the connection frame 213, and a first stationary plate 215a joined to the upper frame 211c and the lower frame 211d. Also, a second stationary plate 215b that opposes the first stationary plate 215a at the other side Z2 in the third direction Z is fixed to the fixing-support plate 214; a third stationary plate 215c that opposes the second stationary plate 215b at a predetermined distance at the other side Z2 in the third direction Z is fixed to the second stationary plate 215b. A fourth stationary plate 215d that opposes the third stationary plate 215c at a predetermined distance at one side Z1 in the third direction Z is fixed to the third stationary plate 215c. In the fixed body 210, also, a guide shaft 217a and a guide shaft 217b are fixed between the first stationary plate 215a and the second stationary plate 215b.

In this embodiment, a movable plate 229 is supported movable in the third direction Z relative to the guide shaft 217a and the guide shaft 217b through bearings 217e and 217f, and a movable holding frame 223 that extends in the second direction Y is connected to the movable plate 229 through a movable-plate-support plate (no illustration) and a movable connecting plate 224. The reinforcement member 3 of the panel 4 is adhered to the surface of such a movable support frame 223 on one side Z1 in the third direction Z. In this manner, the center holding portion 220 displaceable in the third direction Z is configured by the movable plate 229, the movable-plate-support plate (no illustration), the movable connecting plate 224 and the movable holding frame 223.

The mechanism portion 250 is configured by a motor 259 as a driving source and a transmission mechanism 255 which transmits the rotation of the motor 259 to the center holding portion 220 to drive the center holding portion 220 in the Z direction (third direction). In this embodiment, the transmission mechanism 255 is provided with a reduction gear mechanism 258 and a feed screw mechanism 253. The reduction gear mechanism 258 is configured by a first gear 258a equipped with a large diameter gear which meshes with a motor pinion 259a, a second gear 258b equipped with a large diameter gear which meshes with a small diameter gear of the first gear 258a, a third gear 258c equipped with a large diameter gear which meshes with a small diameter gear of the second gear 258b, and a fourth gear 258d equipped with a large diameter gear which meshes with a small diameter gear of the third gear 258c. The feed screw mechanism 253 is provided with a screw shaft 251 which rotates together with the fourth gear 258d and a nut 252 which couples with the screw shaft 251; the nut 252 is joined to the movable plate 229. Note that the screw shaft 251 is supported by a bearing, etc. arranged on the fourth stationary plate 215d, and a thrust bearing 293 fixed to the first stationary plate 215a is provided for the movable plate 229.

In the mechanism portion 250 of the driving device 100 configured as above, the motor 259 is a DC motor with blush in which the motor shaft is rotatable in both directions. When the motor shaft is rotated in one direction in the motor 259, for example, its rotation is transmitted to the screw shaft 251 of the feed screw mechanism 253 through the reduction gear mechanism 258; as a result of this, the center holding portion 220 is displaced to one side Z1 in the third direction Z. On the other hand, when the motor shaft is rotated in the other direction in the motor 259, its rotation is transmitted to the screw shaft 251 of the feed screw mechanism 253 through the reduction gear mechanism 258; as a result of this, the center holding portion 220 is displaced to the other side Z2 in the third direction. Note that although a DC motor with blush is used for the motor 259 in this embodiment, the present invention is not limited to this, but a stepping motor, for example, may be used.

Thus, the driving device 100 has the motor 259 as a driving source in this embodiment, the driving device 100 can be actuated when simply connected to a power source. Therefore, the installation of the optical device 1 is easy. Also, the driving device 100 includes the reduction gear mechanism 258 for reducing the driving force of the motor 259 and transmitting it; therefore, the optical member 2 can be curved by using the small-size motor 259.

(Third Configuration Example of Driving Device)

Figure 15A:
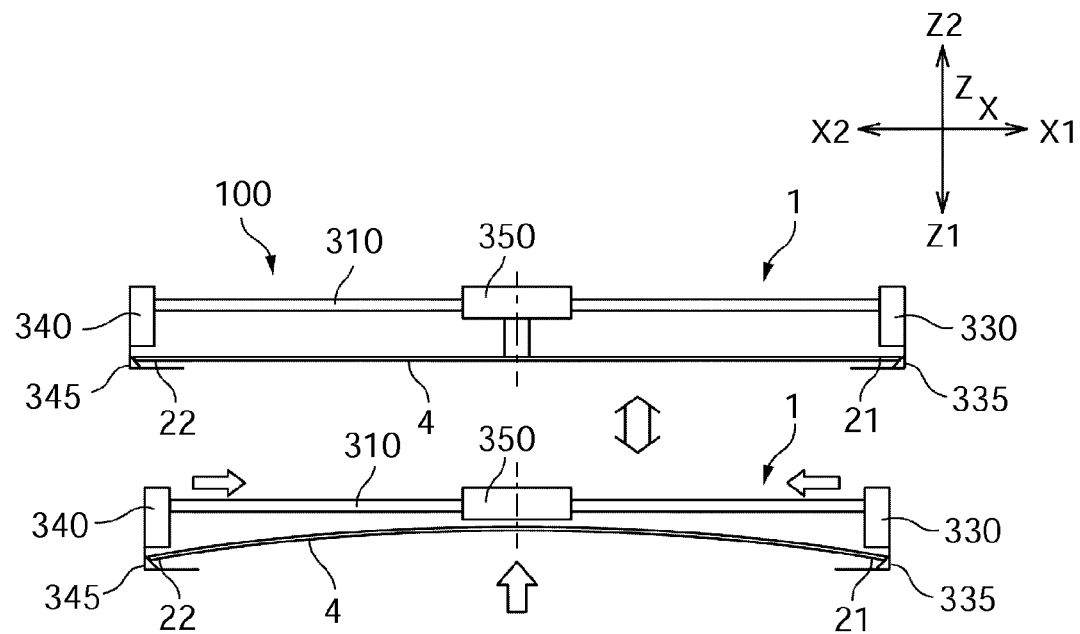
FIGS. 15A-15B are configuration diagrams of the third example of the driving device of the optical device to which at least an embodiment of the present invention is applied.
Figure 15B:
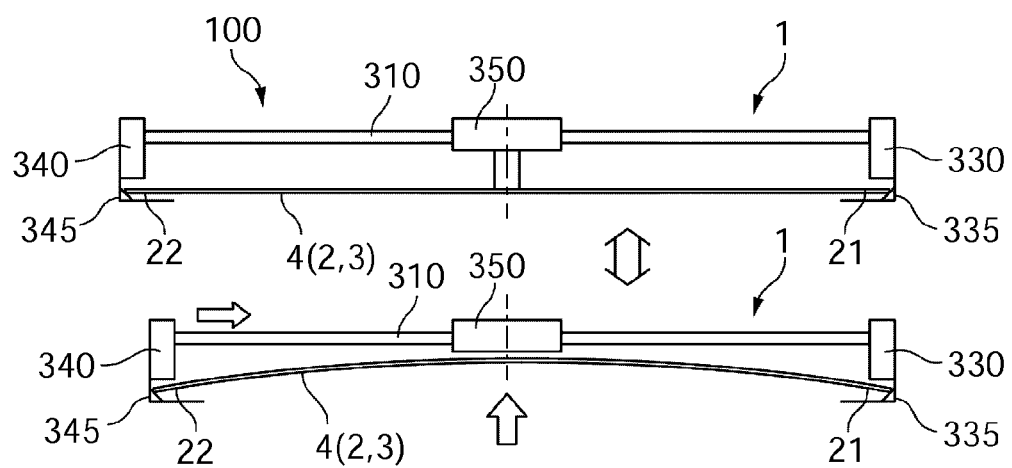

FIG. 15 is a configuration diagram showing the third configuration example of the driving device 100 of the optical device 1 to which at least an embodiment of the present invention is applied: FIG. 15 (a) shows the panel 4 (the optical member 2) in the flat state and in the curved state. Also, FIG. 15 (b) is a modification example of the second configuration example of the driving device 100, showing the panel 4 (the optical member 2) in the flat state and in the curved state.

As shown in FIG. 15 (a), the driving device 100 has a fixed body 310, a first side holding portion 330 for holding the first side portion 21, one of the side portions of the panel 4 in the first direction X, and a second side holding portion 340 for holding the second side portion 22, the other of the side portions of the panel 4 in the first direction X. The driving device 100 also has a mechanism portion 350 that displaces the first side holding portion 330 or the second side holding portion 340 in the direction closer to the other or in the direction farther from the other. In this embodiment, the mechanism portion 350 has a motor as a driving source and a transmission mechanism for transmitting the driving force of the motor to relatively move the first side holding portion 330 and the second side holding portion 340; the transmission mechanism includes a reduction gear mechanism.

Here, the mechanism portion 350 is provided to displace both the first side holding portion 330 and the second side holding portion 340. However, as shown in FIG. 15 (b), the mechanism portion 350 may displace only the first side holding portion 330, out of the first and second holding portions 330 and 340, in the X direction (the first direction) while the second side holding portion 340 is kept fixed.

In the optical device 1 configured as above, the panel 4 is set under the condition where the first side holding portion 330 and the second side holding portion 340 are distanced in the X direction (the first direction). At that time, the panel 4 is flat. Since the first side holding portion 330 and the second side holding portion 340 are formed in a slit shape having an opening larger than the thickness of the panel 4, the two side portions of the panel 4 in the X direction (the first direction) can be respectively displaced to some extent inside of the first side holding portion 330 and inside of the second side holding portion 340. Then, when the first side holding portion 330 and the second side holding portion 340 are drawn closer to each other in the X direction (the first direction) by the mechanism portion 350, the panel 4 is curved to the back side. On the other hand, when the first side holding portion 330 and the second side holding portion 340 are distanced from each other in the X direction (the first direction) by the mechanism portion 350, the panel 4 in the curved state returns to the flat state.

(More Concrete Configuration Example of Third Example of Driving Device)

Figure 16A:
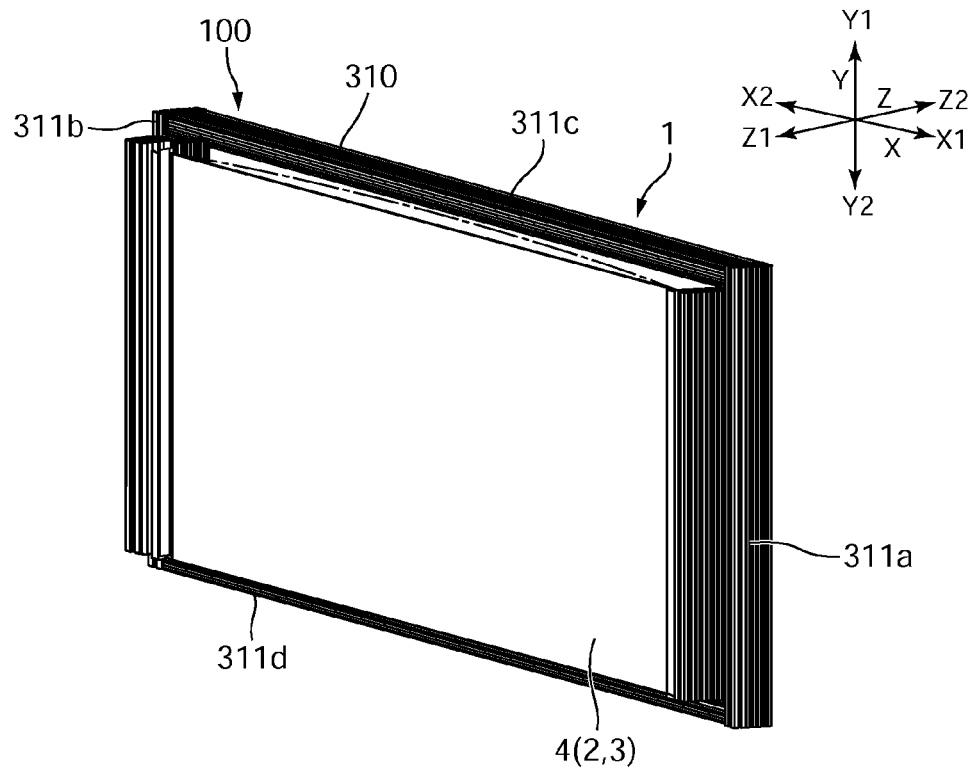
FIGS. 16A-16B explanatory diagram of the concrete composition of the driving device shown in FIG. 15 (a).
Figure 16B:
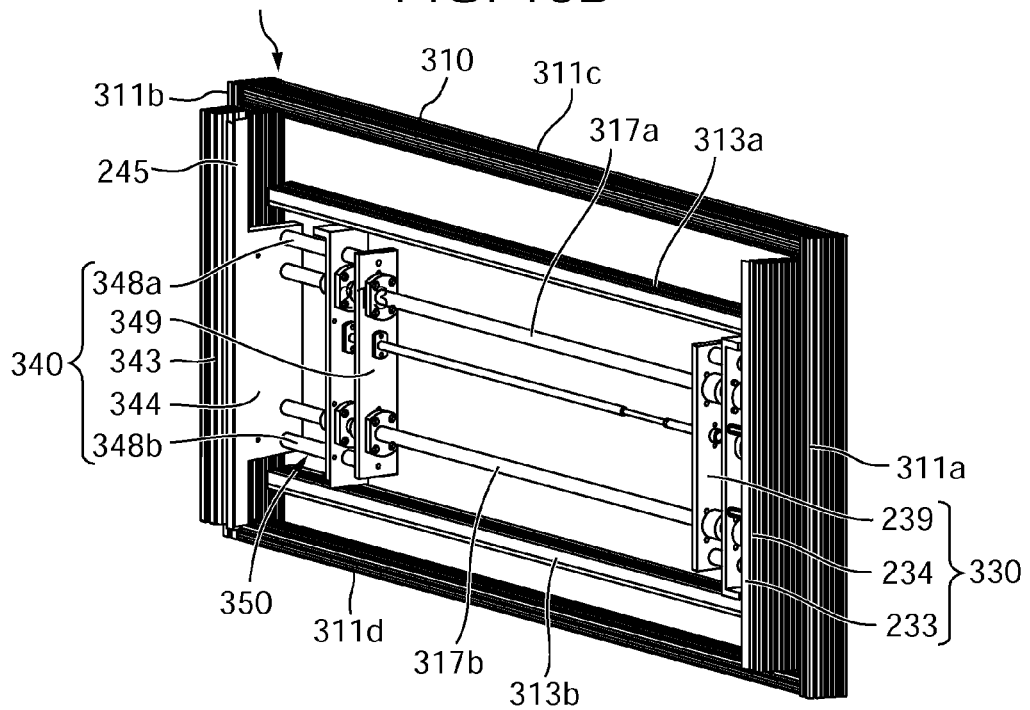
Figure 17A:
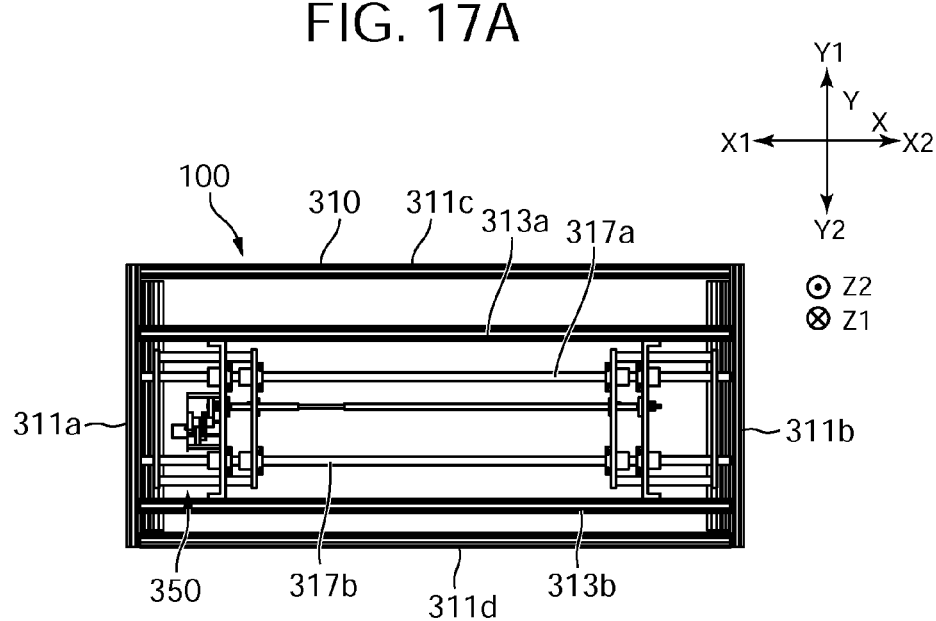
FIGS. 17A-17B are back views of the mechanism portion of the driving device shown in FIG. 16, viewed from the back side.
Figure 17B:
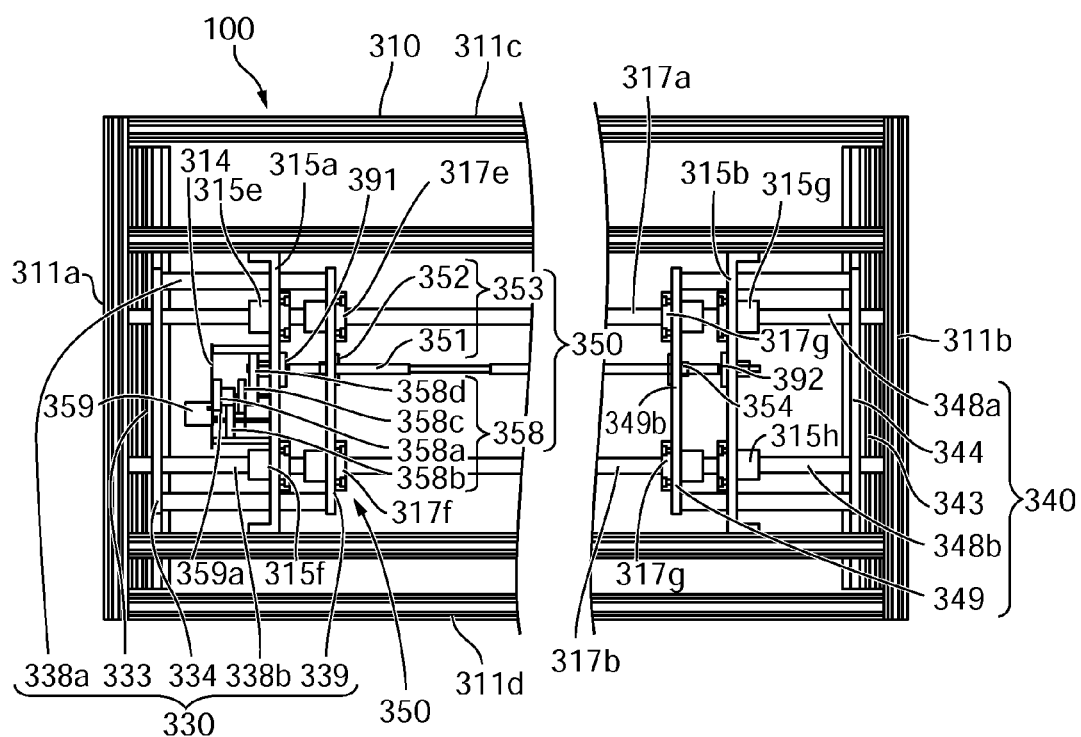

FIG. 16 is an explanatory diagram showing the more concrete configuration of the driving device 100 shown in FIG. 15 (*a*). FIGS. 16 (*a*) and (*b*) are respectively a perspective view of the optical device 1, viewing the front from the diagonal direction, and a perspective view of the driving device without the panel 4. FIG. 17 is the back view of the mechanism portion 250, etc. of the driving device 100 shown in FIG. 16: FIG. 17 (*a*) and (b) are respectively the back view of the mechanism portion 250, etc. and the back view of the magnified mechanism 250, etc. Note that FIG. 16 (*a*) uses the solid line for panel 4 in the flat state and the dot-dash line for the panel 4 in the curved state.

As shown in FIG. 16 and FIG. 17, the driving device 100 has the fixed body 310 positioned on the back side of the panel 4 (on the other side Z2 in the third direction Z), the first side holding portion 330 for holding the first side portion 21, one of the sides of the panel 4 in the first direction X, and the second side holding portion 340 for holding the second side portion 22, the other of the sides of the panel 4 in the first direction X. The driving device 100 also has the mechanism portion 350 which displaces the first side holding portion 330 or the second side holding portion 340 in the direction to be closer to the other or in the direction to be farther from the other.

In this embodiment, the fixed body 310 has vertical frames 311*a* and 311*b* that are opposed to each other in the first direction X, an upper frame 311*c* that connects the corners of the vertical frames 311*a* and 311*b* on one side Y1 in the second direction Y, and a lower frame 311*d* that connects the corner portions of the vertical frames 311*a* and 311*b* on the other side Y2 in the second direction Y. The fixed body 310 also has connection frames 313*a* and 313*b* that extend in the first direction between the upper frame 311*c* and the lower frame 311*d* and are respectively joined to the vertical frames 311*a* and 311*b*.

On the back surface of the panel 4, the mechanism portion 350 is formed to drive the first side holding portion 330 and the second side holding portion 340 individually in the first direction X.

To configure such a mechanism portion, the fixed body 310 is provided with guide shafts 317*a* and 317*b* that extend in the first direction X between the connection frames 313*a* and 313*b* and are respectively joined to the vertical frames 311*a* and 311*b*. The fixed body 310 is also provided with a stationary plate 315*a*, which is fixed to the connection frames 313*a* and 313*b* to be opposite the vertical frame 311*a* on the other side X2 in the first direction X, and a second stationary plate 315*b*, which is fixed to the connection frames 313*a* and 313*b* to be opposite the vertical frame 311*b* on one side X1 in the first direction X; the guide shafts 317*a* and 317*b* extend passing through the first stationary plate 315*a* and the second stationary plate 315*b*. Note that bearings 315*e* and 315*f* are arranged in the portion of the first stationary plate 315*a* through which the guide shafts 317*a* and 317*b* pass, and bearings 315*g* and 315*h* are arranged in the portion of the second stationary plate 315*b* through which the guide shafts 317*a* and 317*b* pass. A support plate 314 that opposes the first fixed plate 315*a* at a predetermined distance at one side X1 in the first direction X is fixed to the first stationary plate 315*a*.

In this embodiment, movable plates 339 and 349 are supported movable in the first direction X by the guide shaft 317*a* and the guide shaft 317*b* through the bearings 317*e*, 317*f*, 317*g* and 317*h*. The movable holding frame 334 that extends in the second direction Y is fixed to the movable plate 339 through the two connecting shafts 338*a* and 338*b* passing through the first stationary plate 315*a*; on the surface of the movable holding frame 334 on the other side X2 in the first direction X, the slit-like receiving portion 335 that extends in the second direction Y to support the first side portion 21 of the panel 4 is configured. On the surface of the movable holding frame 334 on one side X1 in the first direction X, a reinforcement frame 333 extending in the second direction Y is fixed. The movable plate 339, the connecting shafts 338*a* and 338*b*, the reinforcement frame 333 and the movable holding frame 334 configured in the above manner together configure the first side holding portion 330 movable in the first direction X. Also, a movable holding frame 344 extending in the second direction Y is fixed to the movable plate 349 through the two connecting shafts 348*a* and 348*b* passing through the second stationary plate 315*b*; on the surface of the movable holding frame 344 on one side X1 in the first direction X, a slit-like receiving portion 345 extending in the second direction Y to support the second side portion 22 of the panel 4 is configured. On the surface of the movable holding frame 334 on the other side X2 in the first direction X, a reinforcement frame 343 extending in the second direction Y is fixed. The second side holding portion 340 movable in the first direction X is configured by the movable plate 349, the connecting shafts 348*a* and 348*b*, the reinforcement frame 343 and the movable holding frame 344.

The mechanism portion 350 is configured by a motor 359 as a driving source which is fixed to the support plate 314 and a transmission mechanism 355 for transmitting the rotation of the motor 359 to the first side holding portion 130 to drive the first side holding portion 130 in the Z direction. In this embodiment, the transmission mechanism 355 has a reduction gear mechanism 358 and a feed screw mechanism 353. The reduction gear mechanism 358 has a first gear 358*a* equipped with a large diameter gear which meshes with a motor pinion 359*a*, a second gear 358*b* equipped with a large diameter gear which meshes with a small diameter gear of the first gear 358*a*, a third gear 358*c* equipped with a large diameter gear which meshes with the second gear 358*b*, and a fourth gear 358*d* equipped with a large diameter gear which meshes with a small diameter gear of the third gear 358*c*. The feed screw mechanism 353 is equipped with a screw shaft 351 which rotates together with the fourth gear 358*d* and a nut 352 which engages with the screw shaft 351, and the nut 352 is attached to the movable plate 339. Note that the screw shaft 351 is supported by a bearing 391 arranged on the second stationary plate 315a and a bearing 392 arranged on the second stationary plate 315b.

In this embodiment, another nut 354 is provided to the movable plate 349 and engaged with the screw shaft 351. The direction of the screw groove in the engaging portion between the nut 354 and the screw shaft 351 is opposite the direction of the screw groove in the engaging portion between the nut 352 and the screw shaft 351.

In the mechanism portion 350 of the driving device 100 configured as above, the motor 359 is a DC motor with blush in which the motor shaft is rotatable in both directions: when the motor shaft is rotated in one direction in the motor 359, for example, the rotation is transmitted to the screw shaft 351 of the feed screw mechanism 353 through the reduction gear mechanism 358; as a result, the first side holding portion 330 is displaced toward the other side X2 in the first direction X while the second side holding portion 340 is displaced toward one side X in the first direction X. Therefore, the first side holding portion 330 and the second side holding portion 340 are brought closer to each other in the first direction X. On the other hand, when the motor shaft is rotated in the other direction in the motor 359, the rotation is transmitted to the screw shaft 351 of the feed screw mechanism 353 through the reduction gear 358; as a result, the first side holding portion 330 is displaced toward one side X1 in the first direction X while the second side holding portion 340 is displaced toward the other side X2 in the first direction X. Note that, although a DC motor with blush is used for the motor 359 in this embodiment, the present invention is not limited to this, but a stepping motor, etc. may be used, for example.

As described, the driving device 100 has the motor 359 as a driving source in this embodiment; therefore, the driving device 100 can be actuated when simply connected to a power source. Thus, the installation of the optical device 1 is easy. Also, since the driving device 100 includes the reduction gear mechanism 359 for reducing the driving force of the motor 359 and transmitting it, the optical member 2 can be curved by using the small-size motor 359.

(Fourth Configuration Example of Driving Device)

Figure 18A:
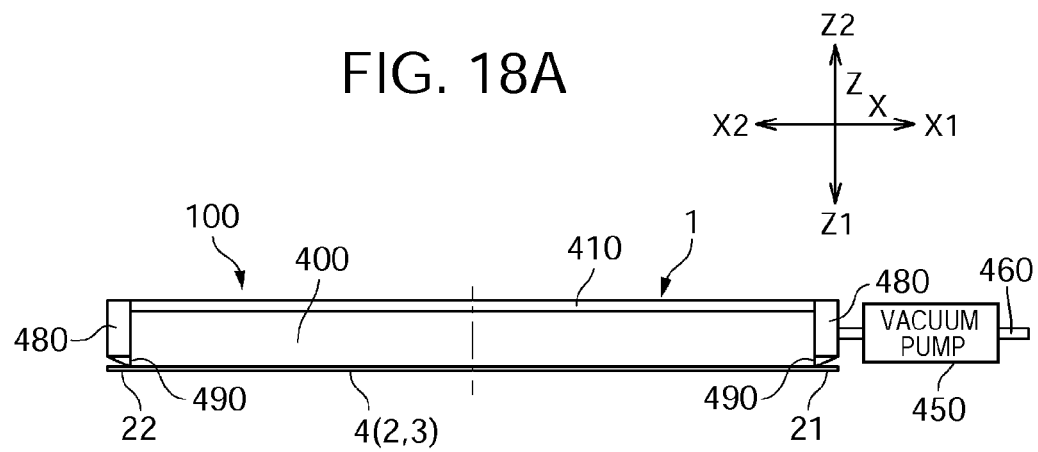
FIGS. 18A-18B are configuration diagrams of the fourth example of the driving device of the optical device to which at least an embodiment of the present invention is applied.
Figure 18B:
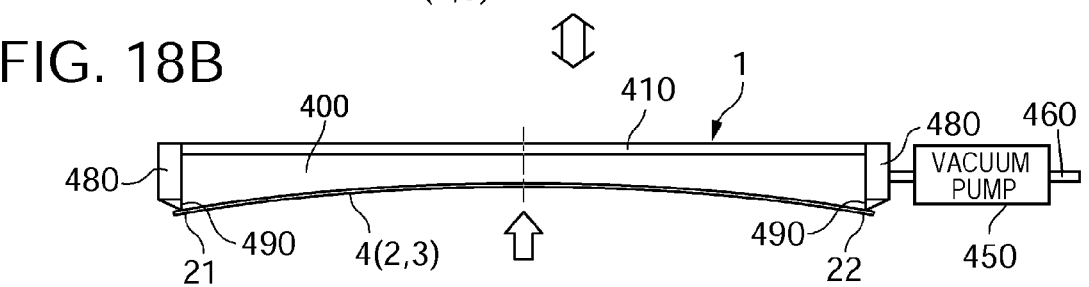

FIG. 18 is a configuration diagram of the fourth configuration example of the driving device 100 of the optical device 1 to which at least an embodiment of the present invention is applied, showing the panel 4 (the optical member 2) in the flat state and in the curved state.

As shown in FIG. 18, the driving device 100 has a case 410 that covers the entire back side of the panel 4 (the other side Z2 in the third direction), and the side plate 480 of the case 410 and the side portions of the panel 4 are connected to each other through a sealing material 490. The driving device 100 also has an air-passage 460 that communicates with a space 400 created between the case 410 and the panel 4 and a vacuum pump 450 that is inserted at the position somewhere in the air passage 460.

In the optical device 1 configured as above, the panel 4 is set under the condition where the vacuum pump 450 is turned off and the space 400 is open to the air. Under this condition, the panel 4 is flat. Then, the vacuum pump 450 is turned on to reduce the pressure inside of the space 400; then, the panel 4 is curved to the back side. On the other hand, when the vacuum pump 450 is turned off to return the inside of the space 400 to the air pressure, the panel 4 in the curved state returns to the flat state.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical device comprising:
a flat optical member;
a reinforcement member which is bonded to a back side of said optical member and demonstrates stronger rigidity in a center area thereof than two side portions thereof when curved in a thickness direction in a first direction within an in-plane direction; and
a driving device which switches a shape of said optical member together with said reinforcement member between a flat state and a curved state in which said optical member is curved in said first direction;
wherein said reinforcement member is formed such that a dimension thereof in a second direction orthogonal to said first direction in said in-plane direction is widened from said two side portions toward said center area;
said reinforcement member has a center portion that layers on the center area of said optical member in said first direction, a first extension portion which extends from one end portion of said center portion in said second direction toward said two side portions, and a second extension portion which extends from the other end of said center portion in said second direction toward said two side portions; and
said first extension portion and said second extension portion are formed such that the dimension thereof in said second direction is widened from said two side portions toward said center area.

2. The optical device as set forth in claim 1 wherein said reinforcement member is formed such that the dimension thereof in said second direction orthogonal to said first direction within said in-plane direction is steadily widened from said two side portions toward said center area.

3. The optical device as set forth in claim 1 wherein said reinforcement member is formed such that a thickness of said center area in said first direction is greater than a thickness of said two side portions.

4. The optical device as set forth in claim 1, wherein said driving device has a motor as a driving source.

5. The optical device as set forth in claim 4 wherein said driving device has a center holding portion structured to hold the center of said optical device, a first side holding portion structured to hold a first side portion, one of said two side portions of said optical member, a second side holding portion structured to hold a second side portion, the other of said two side portions of said optical member, and a transmission mechanism structured to transmit the driving force of said motor to move said first side holding portion and said second side holding portion in the thickness direction of said optical member relative to said center holding portion.

6. The optical device as set forth in claim 5 wherein said transmission mechanism is structured to transmit the driving force of said motor to displace said first side holding portion and said second side holding portion in the thickness direction of said optical member relative to said center holding portion.

7. The optical device as set forth in claim 5 wherein said transmission mechanism is structured to transmit the driving force of said motor to displace said center holding portion in the thickness direction of said optical member relative to said first side holding portion and said second side holding portion.

8. The optical device as set forth in claim 4 wherein said driving device has a first side holding portion structured to hold a first side portion, one of said two side portions of said optical member, a second side holding portion structured to hold a second side portion, the other of said two side portions of said optical member, and a transmission mechanism structured to transmit the driving force of said motor to displace either said first side holding portion or said second side holding portion in the direction to be closer to the other and in the direction to be farther from the other.

9. The optical device as set forth in claim 4, wherein said driving device includes a reduction gear mechanism for reducing a driving force of said motor and transmitting it.

10. An optical device comprising:
a flat optical member;
a reinforcement member which is bonded to a back side of said optical member, wherein a center area of the reinforcement member has a stronger rigidity than two side portions of the reinforcement member when the reinforcement member is curved in a thickness direction in a first direction within an in-plane direction; and
a driving device which switches a shape of said optical member together with said reinforcement member between a flat state and a curved state in which said optical member is curved in said first direction;
wherein said reinforcement member is formed such that a dimension thereof in a second direction orthogonal to said first direction in said in-plane direction is widened from said two side portions toward said center area;
said reinforcement member has a center portion that layers on the center area of said optical member in said first direction, a first extension portion which extends from one end portion of said center portion in said second direction toward said two side portions, and a second extension portion which extends from the other end of said center portion in said second direction toward said two side portions; and
said first extension portion and said second extension portion are formed such that the dimension thereof in said second direction is widened from said two side portions toward said center area.

11. An optical device comprising:
a flat optical member;
a reinforcement member which is bonded to a back side of said optical member and demonstrates stronger rigidity in a center area thereof than two side portions thereof when curved in a thickness direction in a first direction within an in-plane direction; and
a driving device which switches a shape of said optical member together with said reinforcement member between a flat state and a curved state in which said optical member is curved in said first direction;
wherein said driving device has a motor as a driving source;
wherein said driving device has a center holding portion structured to hold the center of said optical device, a first side holding portion structured to hold a first side portion, one of said two side portions of said optical member, a second side holding portion structured to hold a second side portion, the other of said two side portions of said optical member, and a transmission mechanism structured to transmit the driving force of said motor to move said first side holding portion and said second side holding portion in the thickness direction of said optical member relative to said center holding portion.

* * * * *